United States Patent
Fukui et al.

(10) Patent No.: US 8,332,615 B2
(45) Date of Patent: Dec. 11, 2012

(54) MANAGEMENT SYSTEM AND COMPUTER SYSTEM MANAGEMENT METHOD

(75) Inventors: Yoshiki Fukui, Yokohama (JP); Nobuo Beniyama, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 323 days.

(21) Appl. No.: 12/838,537

(22) Filed: Jul. 19, 2010

(65) Prior Publication Data

US 2011/0246745 A1 Oct. 6, 2011

(30) Foreign Application Priority Data

Apr. 2, 2010 (JP) ................................. 2010-085942

(51) Int. Cl.
*G06F 12/00* (2006.01)
(52) U.S. Cl. ................ 711/209; 711/111; 711/E12.078; 714/47.1; 714/E11.202
(58) Field of Classification Search .................... None
See application file for complete search history.

(56) References Cited

U.S. PATENT DOCUMENTS

| | | | |
|---|---|---|---|
| 6,826,711 B2 * | 11/2004 | Moulton et al. ............. | 714/6.12 |
| 7,286,967 B2 * | 10/2007 | Simes ........................... | 702/185 |
| 7,613,945 B2 | 11/2009 | Soran et al. | |
| 2004/0083335 A1* | 4/2004 | Gonzalez et al. ............. | 711/103 |
| 2004/0139282 A1* | 7/2004 | Yoshioka et al. ............. | 711/133 |
| 2007/0223332 A1* | 9/2007 | Fujinami et al. ............ | 369/47.22 |
| 2008/0208536 A1* | 8/2008 | Bondi ........................... | 702/186 |
| 2009/0300285 A1 | 12/2009 | Nagai et al. | |
| 2010/0211737 A1* | 8/2010 | Flynn et al. ................... | 711/114 |
| 2010/0254408 A1* | 10/2010 | Kuno et al. .................... | 370/474 |
| 2011/0078395 A1* | 3/2011 | Okada et al. .................. | 711/162 |
| 2011/0228834 A1* | 9/2011 | Umayabashi et al. ........ | 375/224 |

FOREIGN PATENT DOCUMENTS

JP 2007-66259 A 3/2007

* cited by examiner

*Primary Examiner* — Jasmine Song
*Assistant Examiner* — Daniel Bernard
(74) *Attorney, Agent, or Firm* — Mattingly & Malur, PC

(57) ABSTRACT

A management system detects a peak time period during which accesses are concentrated on a logical page included in a logical volume, and reallocates this logical page to an appropriate physical page. A management server detects an access variation of each logical volume, and selects a volume with a large access variation as a target volume. The management server measures the access status of each logical page in the target volume, and allocates a logical page to a more appropriate physical page.

15 Claims, 35 Drawing Sheets

PHYSICAL DEVICE INFORMATION

| LOGICAL STORAGE POOL IDENTIFIER STORAGE POOL (C110) | PHYSICAL DEVICE IDENTIFIER DEVICE (C111) | PHYSICAL PAGE IDENTIFIER (C112) |
|---|---|---|
| STORAGE POOL 1 | DEVICE A | PA 1 |
| STORAGE POOL 1 | DEVICE A | PA 2 |
| STORAGE POOL 1 | DEVICE A | PA 3 |
| STORAGE POOL 1 | DEVICE B | PB 1 |
| STORAGE POOL 1 | DEVICE B | PB 2 |
| STORAGE POOL 1 | DEVICE B | PB 3 |
| STORAGE POOL 1 | DEVICE C | PC1 |
| STORAGE POOL 1 | DEVICE C | PC 2 |
| STORAGE POOL 1 | DEVICE C | PC 3 |
| STORAGE POOL 1 | DEVICE C | PC 4 |

LOGICAL POOL VOLUME INFORMATION

| LOGICAL STORAGE POOL IDENTIFIER STORAGE POOL (C120) | LOGICAL POOL VOLUME IDENTIFIER POOL VOLUME (C121) | LOGICAL PAGE IDENTIFIER (C122) |
|---|---|---|
| STORAGE POOL 1 | POOL VOLUME A | LA 1 |
| STORAGE POOL 1 | POOL VOLUME A | LA 2 |
| STORAGE POOL 1 | POOL VOLUME A | LA 3 |
| STORAGE POOL 1 | POOL VOLUME A | LA 4 |
| STORAGE POOL 1 | POOL VOLUME B | LB 1 |
| STORAGE POOL 1 | POOL VOLUME B | LB 2 |
| STORAGE POOL 1 | POOL VOLUME B | LB 3 |
| STORAGE POOL 1 | POOL VOLUME B | LB 4 |
| STORAGE POOL 1 | POOL VOLUME B | LB 5 |

PAGE MAPPING INFORMATION

| PHYSICAL PAGE IDENTIFIER (C130) | LOGICAL PAGE IDENTIFIER UNUSED (C131) | PHYSICAL PAGE UPPER LIMIT NUMBER OF I/Os (C132) |
|---|---|---|
| PA 1 | LA 1 | 30/min |
| PA 2 | LB 1 | 30/min |
| PA 3 | UNUSED | 30/min |
| PB 1 | LA 2 | 20/min |
| PB 2 | LB 2 | 20/min |
| PB 3 | LB 3 | 20/min |
| PC 1 | LA 3 | 10/min |
| PC 2 | UNUSED | 10/min |
| PC 3 | UNUSED | 10/min |
| PC 4 | UNUSED | 10/min |

FIG. 11

| LOGICAL POOL VOLUME IDENTIFIER POOL VOLUME (C140) | VOLUME ACCESS VARIATION (C141) | SIZE DETERMINATION VALUE (C142) |
|---|---|---|
| POOL VOLUME A | 220 | LARGE |
| POOL VOLUME B | 150 | SMALL |
| POOL VOLUME C | 197 | LARGE |

BY-VOLUME ACCESS VARIATION INFORMATION (T140)

BY-VOLUME CHRONOLOGICAL ACCESS INFORMATION

| LOGICAL POOL VOLUME IDENTIFIER POOL VOLUME (C150) | TIME (C151) | NUMBER OF I/Os (C152) |
|---|---|---|
| POOL VOLUME 1 | 00:00 | 10 |
| POOL VOLUME 1 | 00:01 | 10 |
| POOL VOLUME 1 | 00:02 | 50 |
| POOL VOLUME 1 | ... | ... |
| POOL VOLUME 1 | 23:59 | 10 |
| POOL VOLUME 2 | 00:00 | 20 |
| POOL VOLUME 2 | 00:01 | 20 |
| POOL VOLUME 2 | 00:02 | 20 |
| POOL VOLUME 2 | ... | ... |
| POOL VOLUME 2 | 23:59 | 20 |

POLICY INFORMATION FOR COMPUTING BY-VOLUME ACCESS VARIATION

| POLICY IDENTIFIER (C160) | VALUE (C161) |
|---|---|
| PEAK TIME DETERMINATION CONSTANT | 0.7 |
| NUMBER OF VOLUME SELECTIONS (Nv) | 30 |

| BY-PAGE NON-CHRONOLOGICAL ACCESS INFORMATION | | | | |
|---|---|---|---|---|
| C170 | C171 | C172 | C173 | C174 |
| LOGICAL PAGE IDENTIFIER | TOTAL NUMBER OF I/Os | REALLOCATION DESTINATION DETERMINATION INDEX | START TIME | END TIME |
| LA 1 | – | – | – | – |
| LA 2 | – | – | – | – |
| LA 3 | – | – | – | – |
| LA 4 | – | – | – | – |
| LB 1 | 10000 | – | 00:00 | 23:59 |
| LB 2 | 10000 | – | 00:00 | 23:59 |
| LB 3 | 40000 | – | 00:00 | 23:59 |
| LB 4 | 20000 | – | 00:00 | 23:59 |
| LB 5 | 38000 | – | 00:00 | 23:59 |

| BY-PAGE CHRONOLOGICAL ACCESS INFORMATION | | |
|---|---|---|
| C180 | C181 | C182 |
| LOGICAL PAGE IDENTIFIER | TIME | NUMBER OF I/Os |
| LA 1 | 00:00 | 20 |
| | 00:01 | 10 |
| | 00:02 | 50 |
| | ... | ... |
| | 23:59 | 20 |
| LA 2 | | |
| LA 3 | | |
| LA 4 | | |

Figure 17:
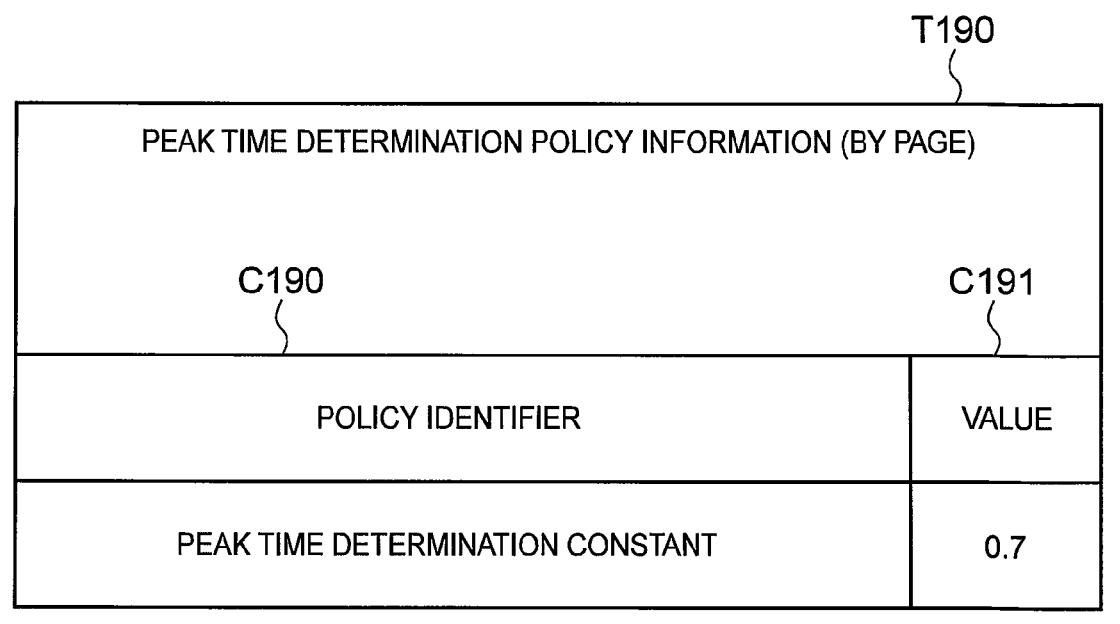

| PEAK TIME DETERMINATION POLICY INFORMATION (BY PAGE) ||
| --- | --- |
| C190 | C191 |
| POLICY IDENTIFIER | VALUE |
| PEAK TIME DETERMINATION CONSTANT | 0.7 |

FIG. 28

| | | | | T170 |
|---|---|---|---|---|
| BY-PAGE NON-CHRONOLOGICAL ACCESS INFORMATION | | | | |
| C170 | C171 | C172 | C173 | C174 |
| LOGICAL PAGE IDENTIFIER | TOTAL NUMBER OF I/Os | REALLOCATION DESTINATION DETERMINATION INDEX | START TIME | END TIME |
| LA 1 | 500 | 8.3 | 15:00 | 15:59 |
| LA 2 | 800 | 26.7 | 12:00 | 12:29 |
| LA 3 | 8000 | 33.3 | 01:00 | 04:59 |
| LA 4 | 8000 | 33.3 | 01:00 | 04:59 |
| LB 1 | 10000 | 6.9 | 00:00 | 23:59 |
| LB 2 | 10000 | 6.9 | 00:00 | 23:59 |
| LB 3 | 40000 | 27.7 | 00:00 | 23:59 |
| LB 4 | 20000 | 13.9 | 00:00 | 23:59 |
| LB 5 | 38000 | 26.4 | 00:00 | 23:59 |

FIG. 30

POLICY CONFIGURATION — G10

GA1:
- POLICY INFORMATION FOR COMPUTING BY-VOLUME ACCESS VARIATION
- PEAK TIME DETERMINATION CONSTANT — SL1 — 0.7
- NUMBER OF VOLUME SELECTIONS (Nv) — SL2 — 30
- INDIVIDUAL VOLUME SELECTION: — [Select] B10

GA2:
- POLICY INFORMATION FOR COMPUTING BY-PAGE ACCESS VARIATION
- PEAK TIME DETERMINATION CONSTANT: — SL3 — 0.7

GA3:
- SIMULATION
- SUM OF PRE-REALLOCATION ACCESS VARIATIONS: 45645
- SUM OF POST-REALLOCATION ACCESS VARIATIONS: 2645

[OK]  [CANCEL]

MANAGEMENT SYSTEM AND COMPUTER SYSTEM MANAGEMENT METHOD

CROSS-REFERENCE TO RELATED APPLICATIONS

This application relates to and claims priority from Japanese Patent Application No. 2010-085942 filed on Apr. 2, 2010, the entire disclosure of which is incorporated herein by reference.

BACKGROUND OF THE INVENTION

The present invention relates to a management system and a computer system management method.

A storage control apparatus creates a logical volume in a RAID (Redundant Array of Independent Disks)-based storage area. This logical volume is provided to a host computer (hereinafter, host). The amount of data used by users increases on a daily basis, so that the capacity of a volume size that is configured to meet the current situation will sooner or later become insufficient. Alternatively, configuring a volume size that is in excess of the size currently needed in anticipation of increases in data quantity results in numerous nonessential and non-urgent disk drives and increases costs.

Accordingly, technology for allocating a physical page (an actual storage area) to a logical page in a logical volume in accordance with actual use has been proposed (JP-A-2007-066259, U.S. Pat. No. 7,613,945).

Measuring the number of accesses to each logical page using a per-day average value, and switching the physical page corresponding to the logical page in accordance with the daily average value is conceivable. However, although there will be differences in accordance with the type of application program, the time period during which an application program accesses the logical volume often converges on a specific time period. For example, either the number of accesses to the logical volume will be concentrated on a specific time period in the afternoon, or the number of accesses to the logical volume will be concentrated on a specific time period in the night.

In a case where access to the logical volume is bias toward a specific time period, computing the number of accesses to the logical volume as a per-day average value will not make it possible to detect the characteristic feature of a change in the number of accesses to this logical volume. The concentration of accesses on a specific time period will not emerge for an average value of the number of accesses per day, thus remaining unknown and hidden. Therefore, it will not be possible to associate a logical page comprising the logical volume with an appropriate physical page.

SUMMARY OF THE INVENTION

Accordingly, an object of the present invention relates to a management system and a computer system management method that makes it possible to grasp the true state of a change in the number of accesses relative to a logical page, and to associate the logical page to an appropriate physical page. Another object of the present invention is to provide a management system and a computer system management method that makes it possible to focus on a monitoring-target logical volume, detect a time period during which accesses are concentrated on the respective logical pages included in this logical volume, and associate a logical page to an appropriate physical page. Further objects of the present invention should become clear from the descriptions of the embodiment, which will be explained hereinbelow.

To solve for the above-mentioned problem, a management system according to a first aspect of the present invention is a management system for managing a computer system, which comprises a host computer and a storage control apparatus, and the storage control apparatus provides logical volumes to the host computer by associating each logical page in multiple logical volumes to physical pages of respective multiple storage devices, the management system comprising a microprocessor, a memory that is used by the microprocessor, a user interface that is used by the microprocessor, and a communication interface for the microprocessor to communicate with the host computer and the storage control apparatus, the memory stores first chronological information in which performance measurement values for each of the logical volumes in a predetermined time period including at least a first time period are chronologically arranged, and second chronological information in which performance measurement values for each of the logical pages in another predetermined time period including at least a second time period that is later than the first time period are chronologically arranged, the microprocessor is constituted to output, via the user interface, at least any one or both of the first chronological information and the second chronological information stored in the memory, and the logical page, for which the second chronological information is created, is selected based on a predetermined amount which is computed from the first chronological information and indicates the degree to which the performance measurement value for each of the logical volumes deviates from an average value of the first chronological information.

In a second aspect according to the first aspect, the microprocessor obtains, as the predetermined amount, the area of a region among the first chronological information in which the performance measurement value is continuously equal to or greater than a first threshold which is configured at a value that is equal to or greater than the average value.

In a third aspect according to the second aspect, the microprocessor computes the sum of the predetermined amounts by logical volume, selects, as the target logical volume, a predetermined number of logical volumes in descending order from the sum of the predetermined amounts by logical volume, and creates the second chronological information for the logical page included in the target logical volume.

In a fourth aspect according to the second aspect, the microprocessor computes a sum of the predetermined amounts for each of the logical volumes, displays via the user interface multiple logical volumes in descending order from the sum of the predetermined amounts for each of the logical volumes, selects as a target logical volume a logical volume selected by the user via the user interface, and creates the second chronological information for the logical page included in the target logical volume.

In a fifth aspect according to the fourth aspect, the microprocessor graphically displays, via the user interface, the first chronological information in descending order from the sum of the predetermined amounts for each of the logical volumes.

In a sixth aspect according to the second aspect, the microprocessor computes an access frequency to each of the logical pages included in the second chronological information, and instructs the storage control apparatus via the communication interface to perform a reallocation in order to associate the each logical page with a physical page that has performance corresponding to the each access frequency.

In a seventh aspect according to the sixth aspect, the microprocessor computes, as another predetermined amount, the area of a region among the second chronological information in which the performance measurement value is continuously equal to or greater than a second threshold which is configured at a value that is equal to or greater than an average value of the second chronological information, detects a region comprising the maximum value of multiple of the other predetermined amounts included in the second chronological information as a peak region, computes a performance measurement value per unit of time in the peak region as the access frequency, and instructs the storage control apparatus via the communication interface to perform a reallocation in order to associate the logical page for which the access frequency has been computed, with a physical page that has performance of equal to or greater than the access frequency.

In an eighth aspect according to the sixth aspect, the microprocessor estimates the sum of the predetermined amounts for each of the logical volumes subsequent to a reallocation having been performed by the storage control apparatus, and outputs an estimation result via the user interface.

In a ninth aspect according to the second aspect, a relatively high-performance storage device and a relatively low-performance storage device are mixed together in the multiple storage devices, and a logical page associated with a physical page of the high-performance storage device and a logical page associated with a physical page of the low-performance storage device are mixed together in the multiple logical pages that comprise the logical volume.

A management method according to a tenth aspect is a method for managing a computer system comprising a host computer, a storage control apparatus and a management system, the storage control apparatus comprises multiple logical volumes that are provided to the host computer, multiple storage devices each comprising multiple physical pages, and a control part for associating each logical page included in the each logical volume with any one of the physical pages, the management system, based on information acquired from the storage control apparatus, creates and stores first chronological information in which performance measurement values for each of the logical volumes in a predetermined time period including at least a first time period are chronologically arranged, selects a measurement-target logical page from among the respective logical pages based on a predetermined amount which is computed from the first chronological information and indicates the degree to which the performance measurement value for each of the logical volumes deviates from an average value of the first chronological information, creates and stores, based on information acquired from the storage control apparatus, second chronological information in which performance measurement values for the each measurement-target logical volume in another predetermined time period including at least a second time period that is later than the first time period are chronologically arranged, and outputs, via the user interface, at least any one or both of the stored first chronological information and the second chronological information.

In an eleventh aspect according to the tenth aspect, the management system obtains, as the predetermined amount, the area of a region among the first chronological information in which the performance measurement value is continuously equal to or greater than a first threshold which is configured at a value that is equal to or greater than the average value.

In a twelfth aspect according to the eleventh aspect, the management system computes the sum of the predetermined amounts by logical volume, selects, as the target logical volume, a predetermined number of logical volumes in descending order from the sum of the predetermined amounts by logical volume, and creates the second chronological information for the logical page included in the target logical volume.

In a thirteenth aspect according to the eleventh aspect, the management system computes a sum of the predetermined amounts by logical volume, displays via the user interface multiple logical volumes in descending order from the sum of the predetermined amounts by logical volume, selects as the target logical volume a logical volume selected by the user via the user interface, and creates the second chronological information for the logical page included in the target logical volume.

In a fourteenth aspect according to the eleventh aspect, the management system computes the access frequency to each of the logical pages included in the second chronological information, and instructs the storage control apparatus via the communication interface to perform a reallocation in order to associate each logical page with a physical page that has performance corresponding to each access frequency.

In a fifteenth aspect according to the fourteenth aspect, the management system computes, as another predetermined amount, the area of a region among the second chronological information in which the performance measurement value is continuously equal to or greater than a second threshold which is configured at a value that is equal to or greater than an average value of the second chronological information, detects a region comprising the maximum value of multiple of the other predetermined amounts included in the second chronological information as a peak region, computes a performance measurement value per unit of time in the peak region as the access frequency, and instructs the storage control apparatus via the communication interface to perform a reallocation in order to associate the logical page for which the access frequency has been computed, with a physical page that has performance of equal to or greater than the access frequency.

At least a portion of the configuration of the present invention may comprise a computer program. This computer program may be affixed and distributed on a recording medium, or may be delivered via a communication network.

BRIEF DESCRIPTION OF THE DRAWINGS

FIG. 8 is a diagram showing the configuration of physical device information;

FIG. 9 is a diagram showing the configuration of logical pool volume information;

FIG. 10 is a diagram showing the configuration of page mapping information;

FIG. 11 shows the configuration of access variation information by volume;

FIG. 13 shows the configuration of chronological access information by logical volume;

FIG. 14 is a diagram showing the configuration of policy information for computing the access variation by logical volume;

FIG. 15 shows the configuration of non-chronological access information by logical page;

FIG. 16 shows the configuration of chronological access information by logical page;

FIG. 17 shows the configuration of policy information for determining a peak time;

FIG. 28 shows changes in non-chronological access information by page;

FIG. 30 is a diagram showing an example of a screen for configuring a policy;

DESCRIPTION OF THE SPECIFIC EMBODIMENTS

The aspects of the embodiment of the present invention will be explained below based on the drawings. An outline of the present invention will be explained first, followed by an explanation of the embodiment. As will be explained below, in this embodiment, first, a monitoring-target logical volume is selected based on an access variation for each logical volume, next, a peak time period during which there is a large access variation is detected with respect to the logical pages included in the monitoring-target logical volume, and lastly, each logical page is associated with an appropriate physical page based on the access variation of the peak time period. This makes it possible to allocate a logical page to a physical page of appropriate performance without monitoring changes in the access to all the logical pages in all the logical volumes all day long.

Figure 1:
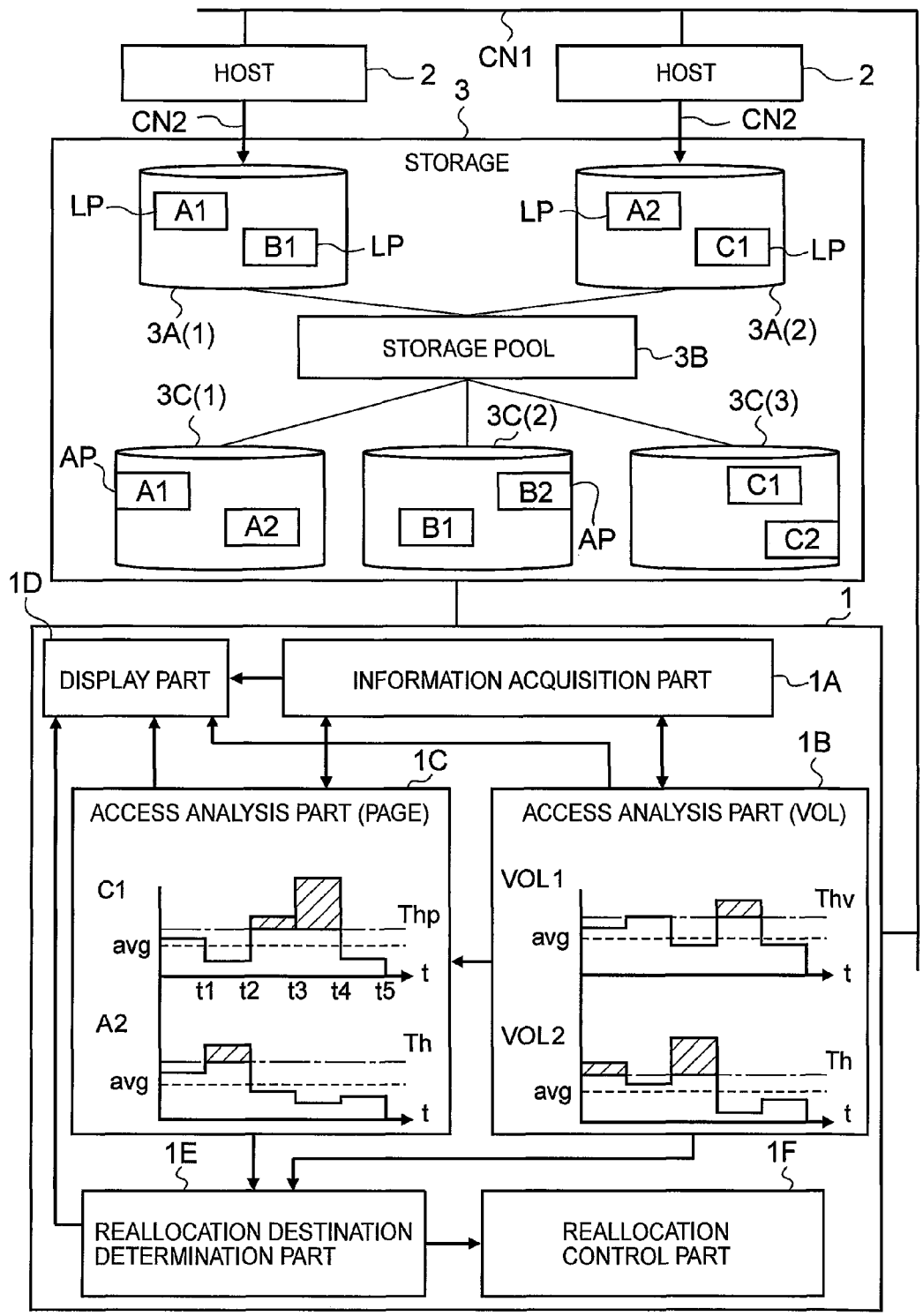
FIG. 1 is a schematic diagram showing the overall concept of an embodiment of the present invention.

FIG. 1 is a schematic diagram showing an overview of the embodiment of the present invention. The following description related to FIG. 1 provides an overview of the present invention to the extent necessary to understand and implement the present invention, but the scope of the present invention is not limited to the configuration shown in FIG. 1.

The computer system shown in FIG. 1 comprises a management server 1 that serves as a "management system", a host computer (hereinafter, host) 2, and a storage control apparatus 3. Furthermore, in the explanation that follows, there may be cases where the storage control apparatus is called a storage for convenience sake. The host 2 and the storage 3 will be explained first, and lastly the management server 1 will be explained.

The host 2, for example, is comprised as a computer apparatus, such as either a server computer or a mainframe computer. In a case where the host 2 is a mainframe computer, for example, data communications are performed in accordance with a communication protocol such as FICON (Fibre Connection: registered trademark), ESCON (Enterprise System Connection: registered trademark), ACONARC (Advanced Connection Architecture: registered trademark), or FIBARC (Fibre Connection Architecture: registered trademark). In a case where the host 2 is a server computer, for example, data communications are performed in accordance with a communication protocol such as FCP (Fibre Channel Protocol) or iSCSI (internet Small Computer System Interface).

The host 2 is coupled to the management server 1 via a management communication network CN1. In addition, the host 2 is coupled to the storage 3 via a data input/output communication network CN2. The configuration may also be such that the management communication network CN1 and the data input/output communication network CN2 are integrated. An application program of the host 2 inputs/outputs data by accessing a logical volume 3A in the storage 3.

The storage 3 is coupled to the host 2 via the data input/output communication network CN2. In addition, the storage 3 is coupled to the management server 1 via the management communication network CN1.

The storage 3 comprises multiple logical volumes 3A(1), 3A(2), a storage pool 3B, and storage devices 3C(1), 3C(2), and 3C(3). Each logical volume 3A(1), 3A(2) (will be called logical volume 3A in a case where no particular distinction is made) is a virtually created logical volume. A logical page LP is provided to the logical volume 3A in accordance with an access from the host 2. The logical page LP, which is a virtual storage area, is associated with a physical page AP, which is an actual storage area. Write data targeted at the logical page LP is actually stored in the physical page AP corresponding to this logical page LP.

The storage pool 3B manages multiple physical pages AP in the multiple storage devices 3C(1), 3C(2), 3C(3) (will be called storage device 3C in a case where no particular distinction is made). Because the logical volume 3A is created using a physical page AP inside the storage pool 3B, there may be cases when it is called either the pool volume or the logical pool volume.

As the storage devices 3C, for example, a hard disk device, a semiconductor memory device, an optical disk device, a magneto-optical disk device, a magnetic tape device, a flexible disk device or other type of device that is capable of reading and writing data may be used.

In a case where a hard disk device is used as the storage device 3C, for example, a FC (Fibre Channel) disk, a SCSI (Small Computer System Interface) disk, a SATA disk, an ATA (AT Attachment) disk, or a SAS (Serial Attached SCSI) disk may be used. Furthermore, for example, it is also possible to use various storage devices 3C, such as a flash memory, a FeRAM (Ferroelectric Random Access Memory), a MRAM (Magnetoresistive Random Access Memory), an Ovonic Unified Memory, and a RRAM (Resistance RAM). In addition, for example, the configuration may also be such that different types of storage devices 3C such as a flash memory and a hard disk drive are intermixed.

A physical storage area of multiple storage devices 3C may be combined into one RAID group, and provided to the storage pool 3B. For example, it is possible to group together four flash memory devices as a RAID 5 group, and to register a physical page of RAID 5 redundancy in the storage pool 3B. Similarly, for example, it is possible to group together two SATA disks as a RAID 1 group, and to register a physical page of RAID 1 redundancy in the storage pool 3B.

The storage pool 3B manages multiple physical pages provided from storage devices 3C having respectively different performance and capacity like this. In accordance with an access from the host 2 to the logical volume 3A, the storage 3 allocates a physical page inside the storage pool 3B to the logical page that has been accessed.

As a result of this, the respective logical pages LP in the respective logical volumes 3A are associated with respectively different types of physical pages AP. The respective logical pages in a first logical volume 3A(1), shown in the drawing as "A1" and "B1", are associated with a physical page in a first storage device 3C(1), and a physical page in a second storage device 3C(2). Similarly, the respective logical pages in a second logical volume 3A(2), shown in the drawing as "A2" and "C1", are associated with a physical page in the first storage device 3C(1), and a physical page in a third storage device 3C(3).

The storage 3, as will be explained below, switches a physical page AP to be associated with a logical page LP in accordance with an instruction from the management server 1. The changing of the physical page AP that is allocated to the logical page LP is called page reallocation herein.

The management server 1, for example, comprises an information acquisition part 1A, a by-volume access analysis part 1B, a by-page access analysis part 1C, a display part 1D, a reallocation destination determination part 1E, and a reallocation control part 1F.

The management server 1 does not necessarily have to comprise a user interface that comprises an input device and a display device. For example, the configuration may be such that an operation terminal for operating the management server 1 is coupled to the management server 1, and an operation from the user is received and a notification to the user is issued via this operation terminal. Furthermore, a configuration in which a display terminal and an operation terminal are coupled to the management server 1, and a configuration in which only a display terminal is coupled to the management server 1 and operations make use of a management server input device are also possible. In addition, the management server 1 need not be configured as a stand-alone computer, but rather may be one management server 1 comprised from multiple computer devices.

The information acquisition part 1A is a function for collecting information from the storage 3. The by-volume access analysis part 1B is a function for analyzing accesses to the respective logical volumes 3A for each logical volume. The by-page access analysis part 1C is a function for analyzing accesses to the respective logical pages LP in the monitoring-target logical volume 3A for each page.

The by-volume access analysis part 1B, for example, respectively measures the daily access variation for each logical volume 3A of the storage 3. The access variation is information showing the extent of the fluctuations in the number of I/Os (number of accesses). The access variation, for example, denotes the deviation of a measured value of the number of I/Os from an average value of the number of I/Os in a predetermined time period. The access variation is a sample variance showing the extent to which a sample deviates from a sample average.

More specifically, the access variation (may be called var in the following examples) is computed as the area of a continuous region in which the number of I/Os is equal to or greater than a predetermined threshold THv as shown by the shaded portion in the access analysis part 1B. The value of the threshold THv can be configured by the user. As a result of a 24-hour access analysis in accordance with the by-volume access analysis part 1B, the logical volume 3A with the relatively largest access variation is selected as the monitoring-target logical volume. The monitoring-target logical volume 3A may be selected automatically, or may be selected manually by the user. In addition, logical volumes that constitute monitoring-target candidates may be automatically arranged in a predetermined order, and the monitoring-target logical volume may be manually selected by the user from thereamong.

The by-page access analysis part 1C, for example, measures the daily access variation for each logical page LP in the logical volume 3A selected as the monitoring target. A second threshold THp is used here to compute the access variation of a logical page.

The by-page access analysis part 1C, based on the size of the access variation shown by the shaded portion inside the access analysis part 1C, respectively detects peak time periods during which accesses are concentrated on a logical page for each logical page.

The reallocation destination determination part 1E is a function for determining the reallocation destination of a logical page. The reallocation destination determination part 1E, based on the analysis result in accordance with the by-page access analysis part 1C, determines whether or not reallocation should be performed for each logical page, and in a case where it has been determined that reallocation should be performed, determines the storage device 3C to which the logical page should be reallocated.

A detailed explanation will follow, but an example will be given of a case in which the number of accesses to a certain logical page during the peak time period exceeds the performance (response performance) of the storage device 3C that comprises the physical page allocated to this logical page. In accordance with this, a determination is made to reallocate this logical page to a higher performance storage device 3C. This is because storage service quality drops significantly in accordance with a concentration of accesses that exceeds the response performance of the storage device 3C.

In contrast to the above, an example will be given of a case in which the number of accesses to another logical page during the peak time period falls below the performance of the storage device 3C that comprises the physical page allocated to this logical page. A determination is made to reallocate this logical page to a storage device 3C of lower performance.

The reallocation control part 1F instructs the storage 3 to carry out a reallocation in accordance with the result determined by the reallocation destination determination part 1E. The storage 3 that receives this reallocation instruction changes the physical page corresponding to the logical page in accordance with the instruction.

By configuring this example like this, a logical volume 3A having a large access variation is selected from among multiple logical volumes 3A as a monitoring target, and a peak time period during which accesses are concentrated on the respective logical pages of the monitoring-target logical volume 3A is detected. Then, in accordance with the number of accesses during the peak time period, the logical page is reallocated to a storage device 3C that comprises the appropriate performance. Therefore, hierarchy management can be performed efficiently in page units, and computer system reliability and usability can be enhanced.

Here we will consider a case in which the present invention is not implemented. When a logical page is not associated with an appropriate physical page, either the access performance of the logical volume deteriorates or the storage device of the storage is used wastefully. For example, in a case where a logical page, which has a concentration of accesses during a specific time period, is associated with a physical page in a low-performance storage device, it takes a longer time to respond to the accesses concentrated in this specific time period. Or, in a case where a logical page having a low access frequency is using a physical page in a high-performance storage device, the high-performance physical page is used wastefully.

Even when the average value of the daily accesses is computed like this, there may be cases where the actual accesses to the logical volume cannot be accurately discerned. For this reason, a method for monitoring only a specific time period during which accesses are expected to be concentrated rather than monitoring daily changes in accesses to a logical volume is conceivable. However, it is troublesome to individually configure monitoring time periods for a large number of logical volumes. In addition, it is difficult to predict a time period during which accesses will be concentrated beforehand.

As another solution, a method via which chronological changes in the number of accesses are monitored and saved throughout the day for each logical page in each logical volume is conceivable. However, due to the large number of logical pages, it is not realistic to record the chronological changes in the number of accesses of all the logical pages.

By contrast, in this example, as described hereinabove, the focus is only on the large-access-variation logical volume 3A of the multiple logical volumes 3A, and chronological changes in the number of accesses for all the logical pages included in this logical volume 3A are measured. Therefore, it is possible to efficiently reallocate a logical page to the appropriate storage device 3C.

Example 1

Figure 2:
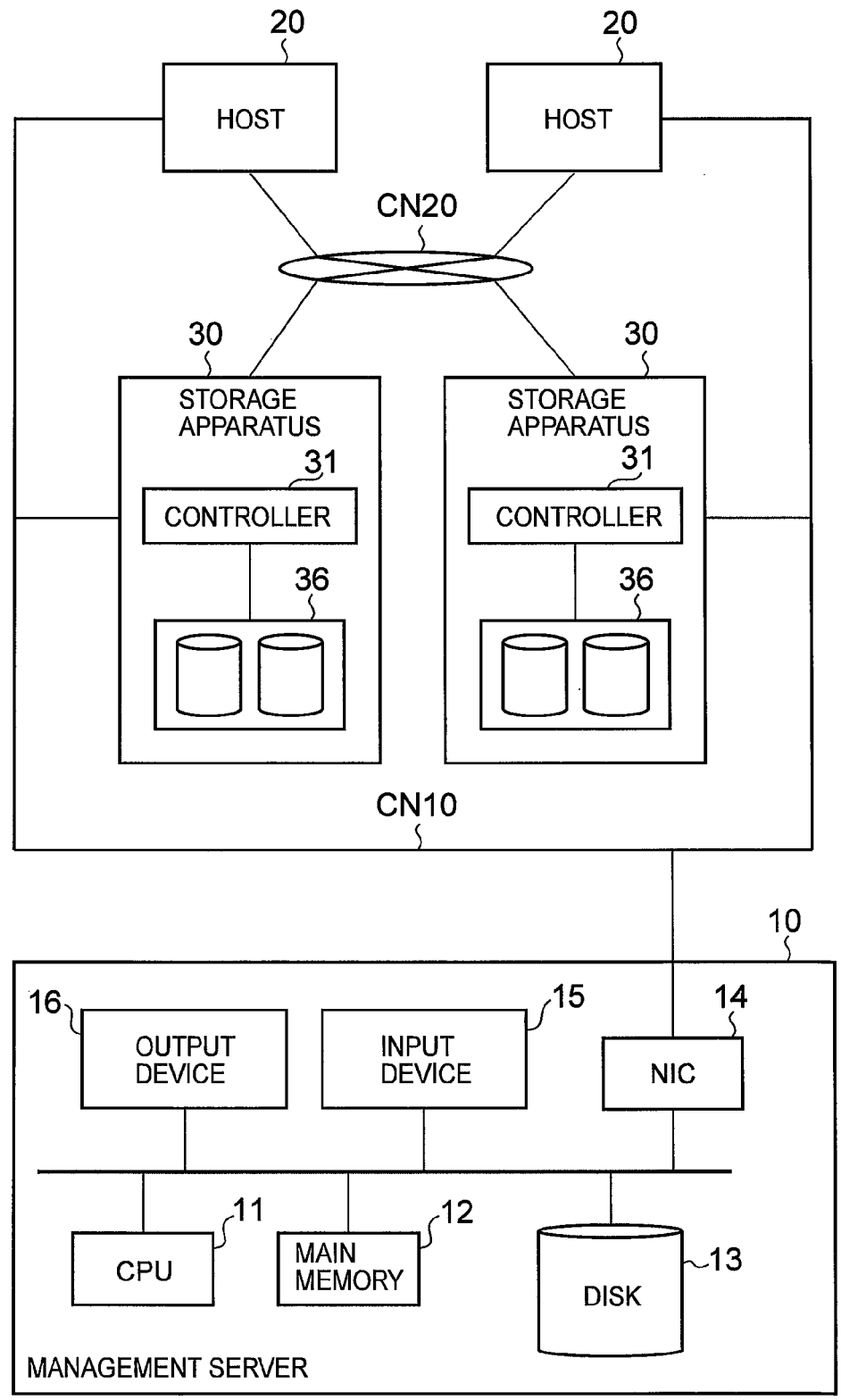
FIG. 2 is a schematic diagram showing the overall configuration of a computer system.

FIG. 2 shows the overall configuration of a computer system related to this example. The computer system, for example, comprises at least one management server 10, at least one host 20, and at least one storage apparatus 30.

First, the corresponding relationship with FIG. 1 will be explained. The management server 10 corresponds to the management server 1, the host 20 corresponds to the host 2, the storage apparatus 30 corresponds to the storage 3, and the communication networks CN10 and CN20 correspond to the communication networks CN1 and CN2. The pool volumes 363A and 363B of FIG. 7 correspond to the logical volume 3A, the logical storage pool 362 of FIG. 7 corresponds to the storage pool 3B, and the actual volumes 361A, 361B and 361C of FIG. 7 correspond to the storage device 3C.

The management server 10, for example, comprises a microprocessor 11, a main memory 12, a disk device 13, a network interface card 14, an input device 15, and an output device 16.

The microprocessor (CPU in the drawing) 11 realizes the various functions described hereinbelow by reading and executing a computer program stored in the main memory 12. The storage contents of the main memory 12 will be described below using FIG. 3. The disk device 13 comprises the main memory 12 and a "memory". The disk device 13 stores various types of management information for managing the storage apparatus 30, and access information collected from the storage apparatus 30, among others. The storage contents of the disk device 13 will be described hereinbelow using FIG. 4.

The network interface card (NIC in the drawing) 14 is a circuit for carrying out communications via the management communication network CN10 that is configured as a LAN. The input device 15 and the output device 16 are for realizing a "user interface".

The input device 15 is utilized by the user to input information to the management server 10, and, for example, may include a keyboard, a pointing device, a touch panel, and a voice-based instruction device. The output device 16 is utilized for providing information to the user, and, for example, may include a display device, a printer, and a voice output device.

Figure 3:
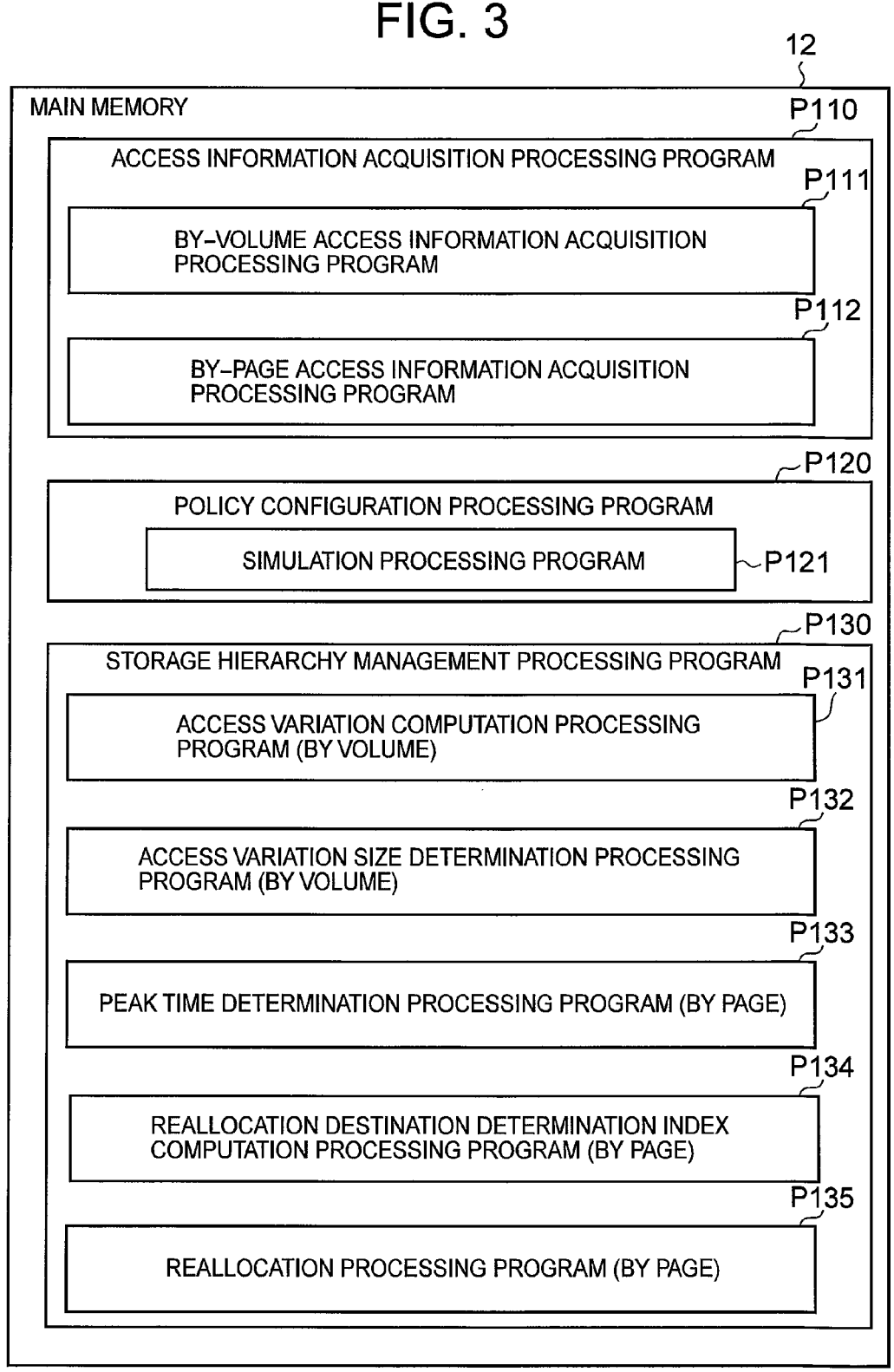
FIG. 3 is a diagram showing information stored in a memory of a management system.

FIG. 3 shows the storage contents of the main memory 12 of the management server 10. The main memory 12, for example, stores an access information acquisition processing program P110, a policy configuration processing program P120, and a storage hierarchy management processing program P130. Furthermore, the main memory 12, for example, also stores a network communication program and a system program (not shown in the drawing) in addition to the above-mentioned processing programs P110, P120, P130. In addition, a work area (not shown in the drawing) is configured in the main memory 12.

The access information acquisition processing program P110 is for acquiring access information from the storage apparatus 30. The access information acquisition processing program P110 comprises a by-volume access information acquisition processing program P111 and a by-page access information acquisition processing program P112. The by-volume access information acquisition processing program P111 is for acquiring from the storage apparatus 30 access information in logical volume (pool volume) units. The by-page access information acquisition processing program P112 is for acquiring access information in logical page units from the storage apparatus 30.

The policy configuration processing program P120 is for configuring a policy to be used when considering a page reallocation. The policy configuration processing program P120 comprises a simulation processing program P121. The simulation processing program P121 is for estimating a change in access variation in a case where a page reallocation has been executed.

The storage hierarchy management processing program P130 is for managing the storage hierarchy in page units. The storage hierarchy management processing program P130 comprises a processing program P131 for computing the access variation by volume, a processing program P132 for determining the size of an access variation by volume, a processing program P133 for determining a peak time by page, a processing program P134 for computing an index for determining a reallocation destination by page, and a processing program P135 for performing a reallocation in page units. These respective processing programs will be explained in detail together with flowcharts hereinbelow.

Figure 4:
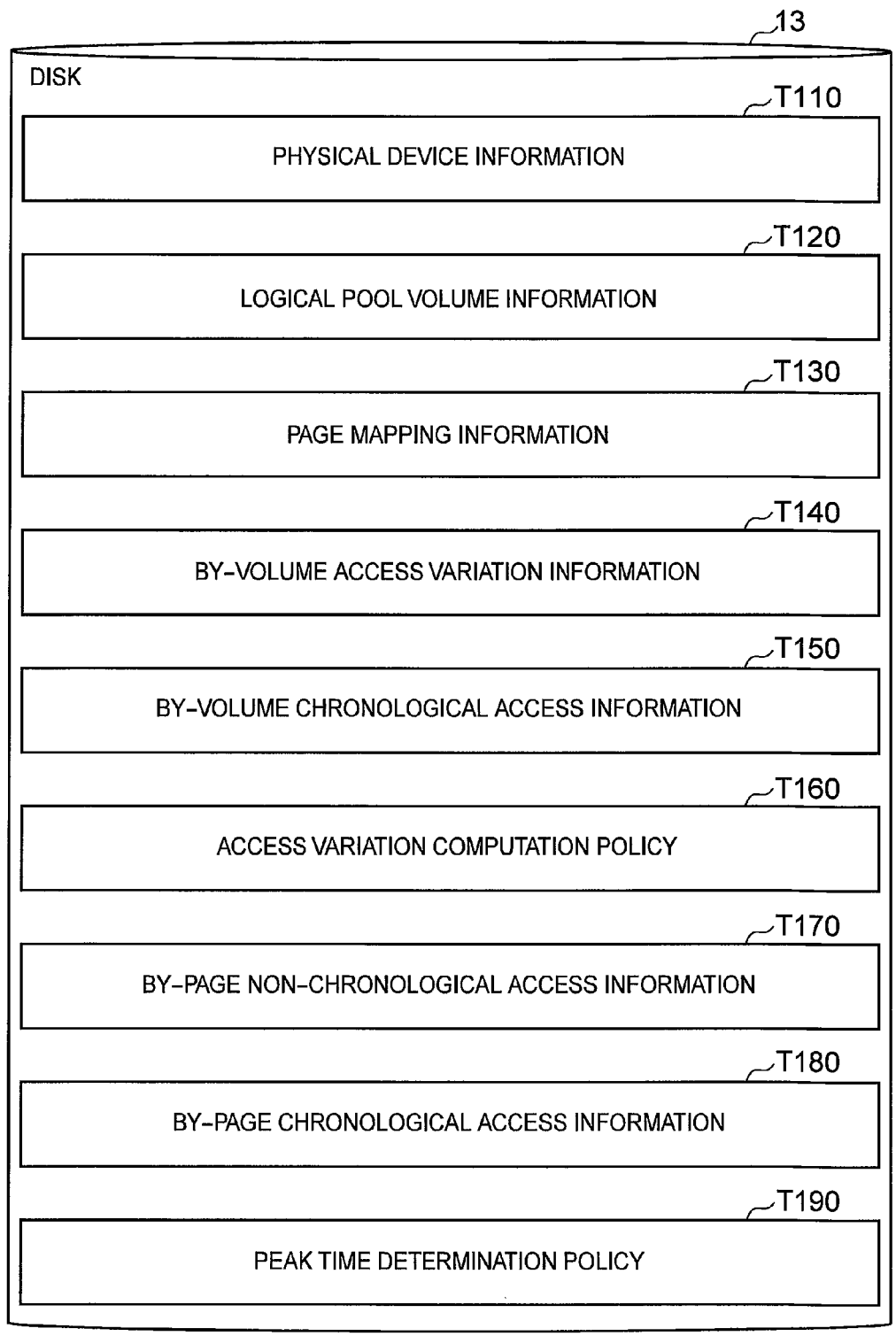
FIG. 4 is a diagram showing information stored on a disk of the management system.

FIG. 4 shows the storage contents of the disk device 13 of the management server 10. The disk device 13 is not limited to a hard disk, and may also be a flash memory device or other such semiconductor memory device.

The disk device 13, for example, comprises physical device information T110, logical pool volume information T120, page mapping information T130, by-volume access variation information T140, by-volume chronological access information T150, a policy T160 for computing an access variation, by-page non-chronological access information T170, by-page chronological access information T180, and a policy T190 for determining a peak time. This respective information will be explained in detail further below.

Figure 5:
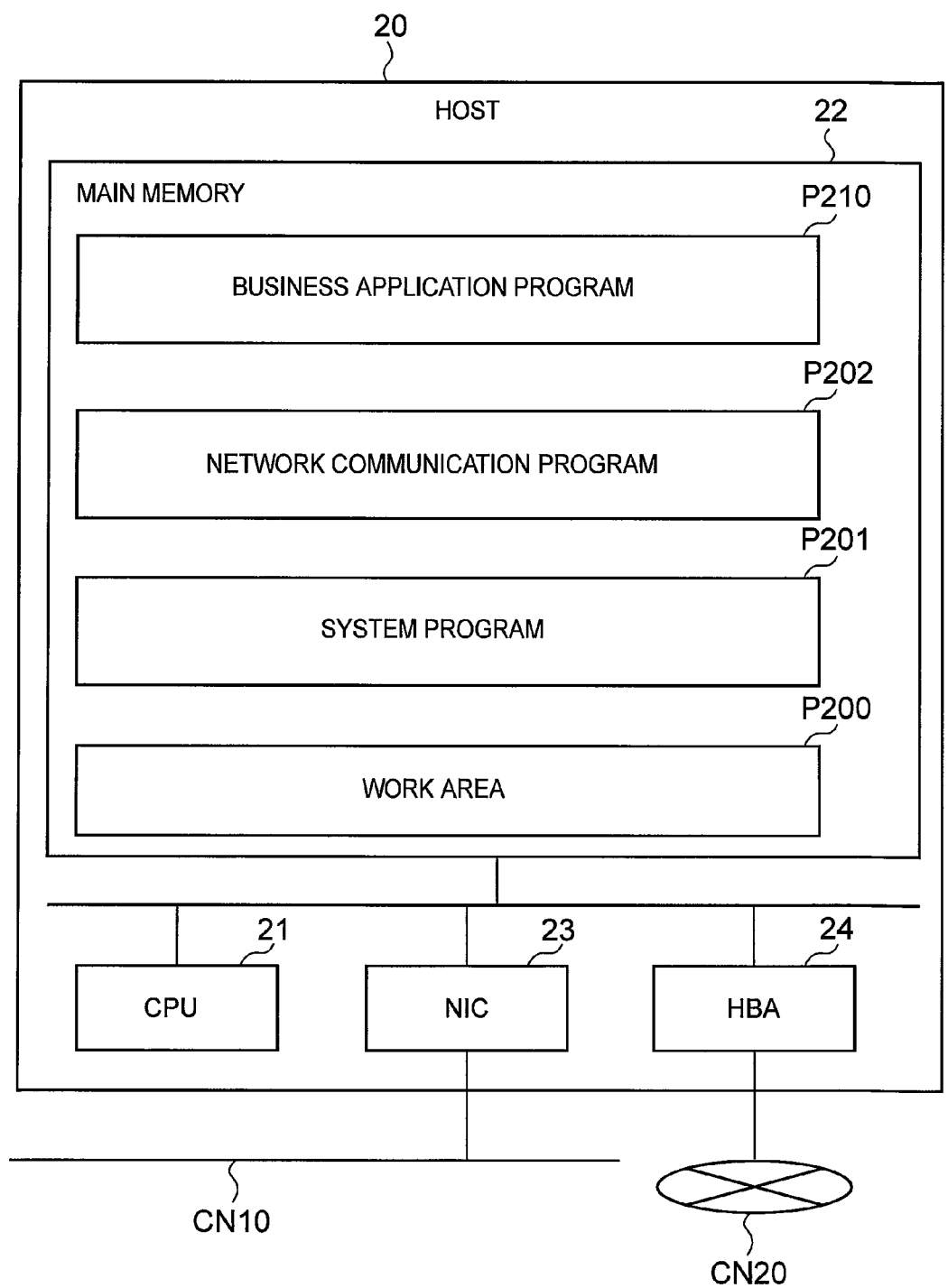
FIG. 5 is a block diagram showing the configuration of a host computer.

FIG. 5 shows the configuration of the host 20. The host 20, for example, comprises a microprocessor 21, a main memory 22, a network interface card 23, and a host bus adapter 24.

The microprocessor 21 reads and executes a computer program that is stored in the main memory 22. The network interface card 23 is a circuit for communicating via the management communication network CN10. The host bus adapter 24 is a circuit for communicating via the data input/output communication network CN20.

The main memory 22, for example, stores a business application program P210, a network communication program P202, and a system program P201. A work area P200 is also configured in the main memory 22 for use by these programs P210, P202, and P201.

The business application program P210 is a computer program for providing business processing services to a client terminal (not shown in the drawing) using a logical pool volume (logical volume) 363 in the storage apparatus 30. The business application program P210, for example, may be a user management program, an accounting program, an electronic mail management program, a video delivery program, a document preparation program, a game program or an image processing program, among others.

Figure 6:
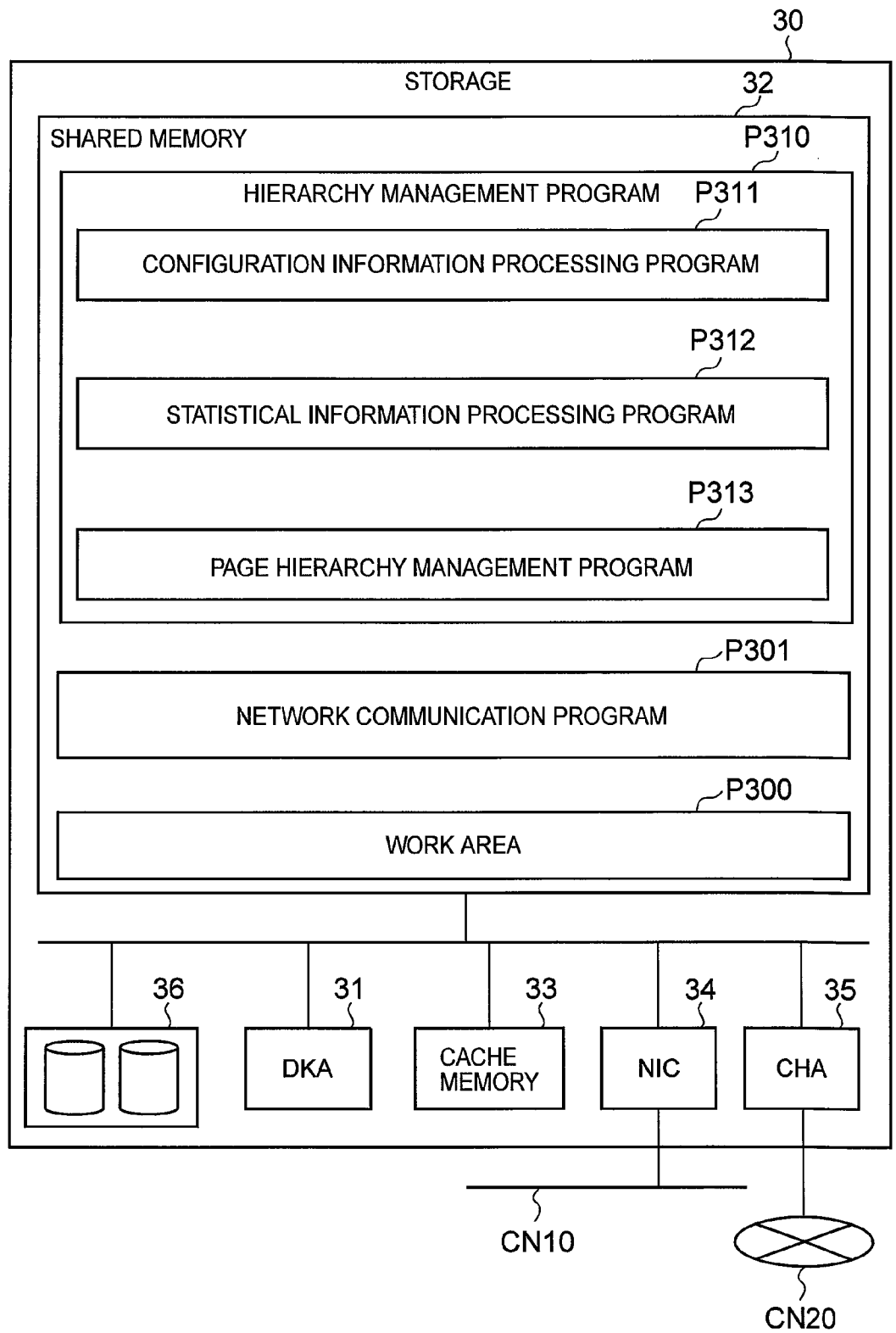
FIG. 6 is a block diagram showing the configuration of a storage device.

FIG. 6 shows the configuration of the storage apparatus 30. The storage apparatus 30, for example, comprises a disk adapter 31, a shared memory 32, a cache memory 33, a network interface card 34, a channel adapter 35, and a storage unit 36.

The disk adapter 31 is a control circuit for communicating with respective storage devices 360A through 360C in the storage unit 36 and performing data input/output. The disk adapter (DKS in the drawing) 31 internally comprises multiple microprocessors and a local memory.

The shared memory 32 is shared by the disk adapter 31 and the channel adapter 35 described below. The shared memory 32, for example, stores a hierarchy management program P310, and a network communication program P301. In addition, a work area P300 may also be provided in the shared memory 32.

The hierarchy management program P310 is for managing the storage hierarchy. The hierarchy management program P310 comprises a configuration information processing program P311, a statistical information processing program P312, and a page hierarchy management program P313.

The configuration information processing program P311 is for managing the configuration information in the storage apparatus 30. The configuration information, for example, comprises the configurations of the storage device, the RAID group, the actual volume, the logical pool volume, the logical page, and the physical page, among others. Simply stated, the configuration information processing program P311 manages configuration information denoting which logical page belongs to which logical pool volume 363, and which logical page corresponds to which physical page.

The statistical information processing program P312, for example, manages various types of statistical information, such as the number of I/Os (number of accesses) to each logical pool volume and the cache hit rate. The page hierarchy management program P313 manages the hierarchy of the pages.

The cache memory 33 temporarily stores either write data that has been received from the host 20, or data that has been read from the logical pool volume. The network interface card 34 is a circuit for communicating via the management communication network CN10.

The channel adapter (CHA in the drawing) 35 is a control circuit for communicating with the host 20 via the data input/output communication network CN20. The channel adapter 35 comprises multiple microprocessors and a local memory just like the disk adapter 31.

Figure 7:
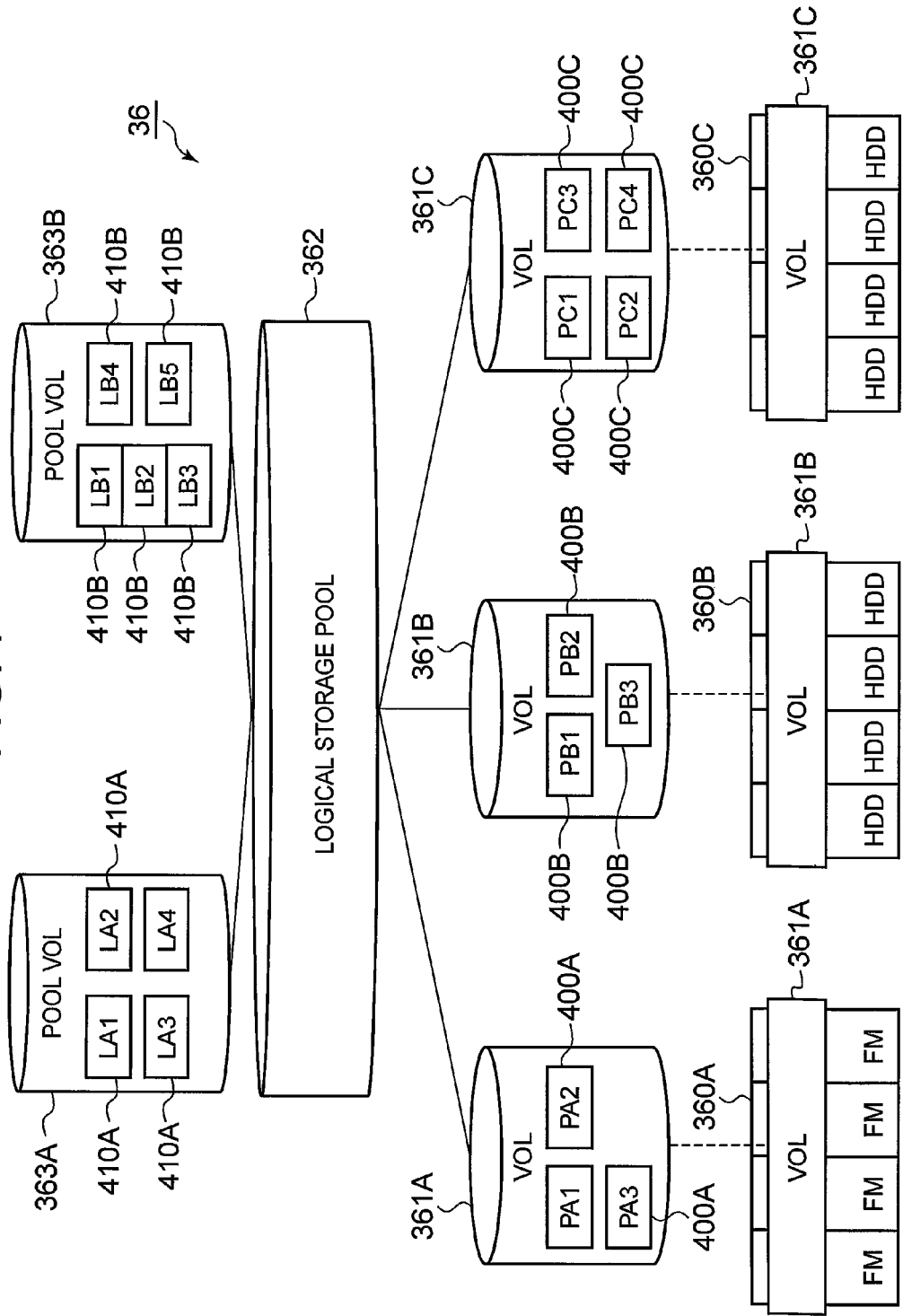
FIG. 7 is a diagram schematically showing the relationship between a logical volume, a logical storage pool, and a storage device.

FIG. 7 schematically shows the configuration of the storage unit 36. The storage unit 36 comprises multiple storage devices 360A, 360B, and 360C. The storage devices 360A through 360C, for example, are comprised from either a hard disk device or a flash memory device. The storage devices 360A through 360C feature respectively different response performance. Furthermore, when no particular distinction is made, these devices will be called storage device 360.

A RAID group may be created using the multiple storage devices 360A through 360C. An actual volume may be created using a physical storage area inside this RAID group. For example, the physical storage areas of the multiple storage devices 360A may be grouped together, and an actual volume 361A may be created by using either all or a portion of this grouped physical storage area. Actual volume signifies a logical volume directly created from a physical storage area. Similarly, the physical storage areas of multiple storage devices 360B may be grouped together, and an actual volume 361B may be created by using either all or a portion of this grouped physical storage area. An actual volume 361C may be created in the same way. When no particular distinction is made between the actual volumes 361A through 361C, these volumes will be called actual volume 361.

The actual volumes 361A through 361C respectively comprise multiple physical pages 400A through 400C. Actual volume 361A comprises physical page 400A. Similarly, actual volume 361B comprises physical page 400B, and actual volume 361C comprises physical page 400C. Furthermore, when no particular distinction is made, the physical pages 400A through 400C will be called physical page 400.

The logical storage pool 362 centrally manages the multiple physical pages 400 that are provided from the respective actual volumes 361.

The logical pool volumes (may also be abbreviated as pool volume) 363A and 363B are virtually created logical volumes. Physical pages 400 are allocated to the logical pool volumes 363A and 363B in accordance with an access from the host 20.

When the host 20 first accesses the logical page 410A in the logical pool volume 363A, an unused physical page 400 is allocated to this accessed logical page 410A. Similarly, when the host 20 first accesses the logical page 410B in the logical pool volume 363B, an unused physical page 400 is allocated to this accessed logical page 410B. Write data from the host 20 is written to the allocated physical page 400. Furthermore, when no particular distinction is made, the logical pool volumes 363A and 363B will be called logical pool volume 363, and logical pages 410A and 410B will be called logical page 400.

An address space of the logical pool volume 363 is associated with an address space of the actual volume 361 using a predetermined unit (page size) like this. The logical storage pool 362 allocates a pooled physical page 400 to each logical pool volume 363 in accordance with a predetermined algorithm. The respective logical pages 410 in each logical pool volume 363 are associated with multiple types of physical pages 400 having different response performances.

For example, a certain logical page 410 in a certain logical pool volume 363 is associated with the physical page 400A of the high-performance storage device 360A, another logical page 410 in the same logical pool volume 363 is associated with the physical page 400B of the medium-performance storage device 360B, and still another logical page 410 in the same logical pool volume 363 is associated with the physical page 400C of the low-performance storage device 360C.

Logical pages 410 corresponding to physical pages 400 having different response performances are mixed together in the logical pool volume 363 like this. Thereafter, using a reallocation, which will be described below, the logical page 410 is associated with a physical page 400 in a more appropriate storage device 360 in accordance with the access status of the logical page 410. For example, a logical page 410 that is frequently accessed during a specific time period will be associated with a higher performance physical page 400. This is to shorten the response time to the host 20. Furthermore, for example, a logical page 410 that is not accessed very much will be associated with a lower performance physical page 400. This is to make effective use of the high-performance storage area.

FIG. 8 shows an example of the physical device information T110. The physical device information T110 is for managing an actual volume 361 as a physical storage device. In the drawing, the actual volume is displayed as "physical device". Furthermore, ID, identification information, identifier, and name are interchangeable in the following explanation.

The physical device information T110, for example, correspondingly manages a logical storage volume identifier column C110, a logical device identifier column C111, and a physical page identifier column C112. The logical storage volume identifier column C110 stores information for identifying the logical storage pool 362. In this example, one logical storage pool 362 is shown, but the storage apparatus 30 may comprise multiple logical storage pools 362.

The physical device identifier column C111 stores information for identifying the respective actual volumes 361, which are physical devices. The physical page identifier column C112 stores information for identifying the respective physical pages 400.

FIG. 9 shows an example of the logical pool volume information T120. The logical pool volume information T120 is information for managing the respective logical pool volumes 363. The logical pool volume information T120, for example, correspondingly manages a logical storage pool identifier column C120, a logical pool volume identifier column C121, and a logical page identifier column C122.

The logical storage pool identifier column C120 stores information for identifying the respective logical storage pools 362. The logical pool volume identifier column C121 stores information for identifying the respective logical pool volumes 363 configured using the logical storage pools 362. The logical page identifier column C122 stores information for identifying the respective logical pages 410 which are included in the respective logical pool volume 363.

FIG. 10 shows an example of the page mapping information T130. The page mapping information T130 is for managing the corresponding relationship between the logical page 410 and the physical page 400. The page mapping information T130, for example, correspondingly manages a physical page identifier column C130, a logical page identifier column C131, and a physical page upper limit number of I/Os column C132.

The physical page identifier column C130 stores information for identifying the respective physical pages 400. The logical page identifier column C131 stores information for identifying the respective logical pages 410. In the case of an unused logical page, a value that indicates this logical page is unused is configured in C131.

The physical page upper limit number of I/Os column C132 stores an upper limit value for the number of I/Os per unit of time that each physical page 400 is allowed. For example, a physical page 400 for which "30/min" is configured is allowed to be accessed up to 30 times per minute. This signifies that in a case where there are within 30 accesses in one minute, the physical page 400 is able to respond within the stipulated response time.

FIG. 11 shows an example of the by-volume access variation information T140. The by-volume access variation information T140 is for managing the access variation of each logical pool volume. The by-volume access variation information T140, for example, correspondingly manages a logical pool volume identifier column C140, a volume access variation column C141, and a size determination value column C142.

The logical pool volume identifier column C140 stores information for identifying the respective logical pool volumes 363. The volume access variation column C141 stores the access variation of each logical pool volume 363. The access variation will be described hereinbelow. The size determination value column C142 stores a value that determines whether the access variation of each logical pool volume is large or small.

Figure 12:
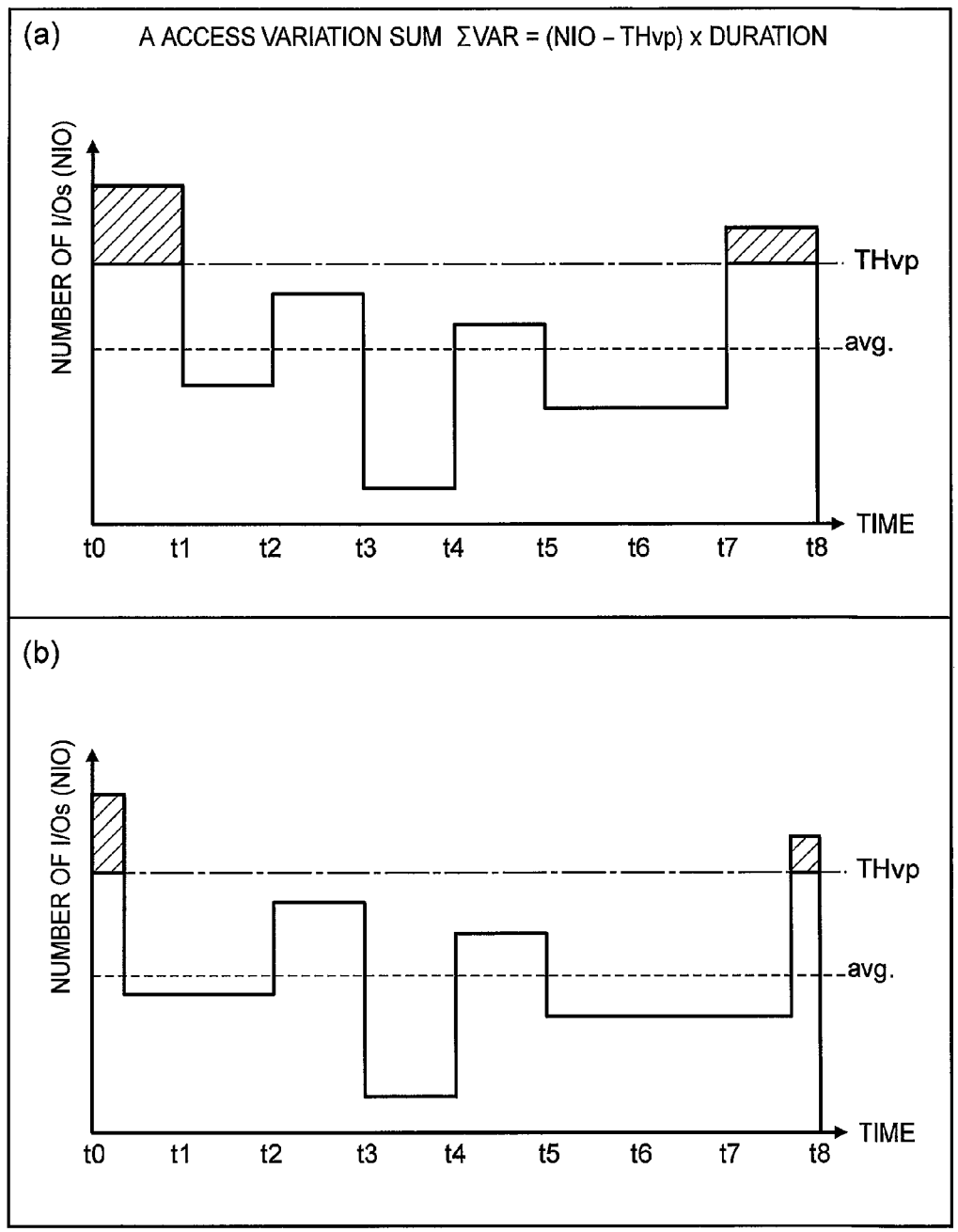
FIG. 12 shows changes over time in access variation by logical volume.

FIG. 12 is a diagram illustrating the access variation of the logical pool volume 363. The horizontal axis of the graph shown in FIG. 12 denotes time, and the vertical axis denotes the number of I/Os (NIO) per minute. "avg." denotes the average value of the number of I/Os per minute. "THvp" corresponds to the "first threshold", and is used for determining the peak time.

As shown in FIGS. 12A and B, the number of I/Os with respect to the logical pool volume 363 changes with the passage of time. The access variation (also displayed as var) is defined as the area of a continuous region in which the number of I/Os is equal to or greater than a first threshold THvp (var=(NIO−THvp)×duration).

The access variation by volume is defined as a value that totals the access variations detected for the respective logical pool volumes 363 for each logical pool volume. That is, the total value of the area indicated by the shaded portions in FIG. 12 denotes the sum of the access variations of this logical pool volume 363.

The access variation shown in FIG. 12A is larger than the access variation shown in FIG. 12B. Accordingly, the access variation of the logical pool volume 363 of FIG. 12A is determined to be "large", and the access variation of the logical pool volume 363 of FIG. 12B is determined to be "small". The method for determining the size of the access variation will be described hereinbelow. The logical pool volume 363 with a relatively large access variation can be said to tend to have a concentration of accesses in a specific time period.

In this example, since the area of the shaded portions (the time period during which the access variation is continuously equal to or greater than the threshold THvp) is regarded as the issue, page hierarchy management can be carried out by ignoring intermittent, temporary access concentrations. As shown in FIG. 12B, in a case where the access concentration only occurs briefly, it is treated as noise since its affect on lowering response performance is negligible. By contrast, since the concentration of accesses occurs over a long time period in the example shown in FIG. 12A, the affect on lowering the response time is considered great. Accordingly, the below-described page reallocation is executed in this case.

FIG. 13 shows an example of the by-volume chronological access information T150. The by-volume chronological access information T150 is for chronologically managing the access information for each logical pool volume.

The by-volume chronological access information T150, for example, correspondingly manages a logical pool volume identifier column C150, a time column C151, and a number of I/Os column C152. The logical pool volume identifier column C150 stores information for identifying the respective logical pool volumes 363. The time column C151 stores time information with respect to when the number of I/Os was recorded. The number of I/Os column C152 stores the number of I/Os for a time stored in the time column C151.

FIG. 14 shows an example of the policy information T160 for computing access variations by volume. The policy information T160 manages a policy used for computing the access variation in logical pool volume units. The policy information T160, for example, comprises a policy identifier column C160, and a value column C161. The policy identifier column C160 stores information for identifying a policy type.

Information for identifying a type of policy includes a peak time determination constant, and a number of volume selections (Nv). The peak time determination constant is used for computing the first threshold THvp shown in FIG. 12. The value of the constant may be configured manually by the user. For example, the value obtained by dividing the constant by the difference between the maximum value (max) and the average value (avg) of the number of I/Os is the first threshold THvp.

The number of volume selections (Nv) shows a number of logical pool volumes 363 to be selected in descending order of access variations. For example, in a case where the number of volume selections is configured as "30", only 30 the logical pool volumes 363 are selected in descending order of access variations. The number of volume selections may also be configured manually by the user. Furthermore, the configuration may be such that the peak time determination constant and the number of volume selections are configured automatically, or such that the user adjusts and uses values that have been recommended automatically.

FIG. 15 shows an example of the by-page non-chronological access information T170. This access information T170 non-chronologically manages access information in logical page units. The access information T170, for example, comprises a logical page identifier column C170, a total number of I/Os column C171, a reallocation destination determination index column C172, a start time column C173, and an end time column C174.

The logical page identifier column C170 stores information for identifying the respective logical pages 410. The total number of I/Os column C171 stores the total number of I/Os that occurred in a logical page 410. The reallocation destination determination index column C172 stores an index that is used for determining the reallocation destination of a logical page 410. The reallocation is the changing of the physical page 400 that corresponds to a logical page 410. The number of I/Os to a logical page 410 per unit of time may be used as the index for determining the reallocation destination. The start time column C173 stores a start time of a continuous region in which the number of I/Os is equal to or greater than a second threshold THpp, which will be described below, in a case where the virtual page belongs to a logical pool volume 363 for which the by-volume access variation has been determined to be "large". Alternatively, in a case where the logical page belongs to a logical pool volume 363 for which the access variation has been determined to be "small", the start time column C173 records the start time (for example, 0:00) recorded for the by-page chronological access information that will be described hereinbelow. The end time column C174 stores an end time of a continuous region in which the number of I/Os is equal to or greater than a second threshold THpp, which will be described below, in a case where the virtual page belongs to a logical pool volume 363 for which the by-volume access variation has been determined to be "large". Alternatively, in a case where the logical page belongs to a logical pool volume 363 for which the access variation has been determined to be "small", the end time column C174 records the end time (for example, 23:59) recorded for the by-page chronological access information that will be described hereinbelow.

As shown in FIG. 15, the respective columns C171, C172, C173, and C174 are blank for the respective logical pages of the one side (LA1, LA2, LA3, LA4). This is because these respective logical pages LA1 through LA4 belong to a logical pool volume 363 for which the by-volume access variation has been determined to be "large". Changes in the number of I/Os for the respective logical pages 410 included in a logical pool volume 363 having an access variation that is large are monitored chronologically. Therefore, at the current point in time, the respective columns C171 through C174 of the respective logical pages LA1 through LA4 are blank. As will be described below, values are configured in the respective columns C171 through C174 of the respective logical pages LA1 through LA4 at the time the reallocation destination is determined.

FIG. 16 shows an example of the by-page chronological access information T180. The chronological access information T180 manages the access information for each logical page in chronological order. The chronological access information T180, for example, comprises a logical page identifier column C180, a time column C181, and a number of I/Os column C182.

The logical page identifier column C180 stores information for identifying the respective logical pages 410. The time column C181 stores the time at which the access information (number of I/Os) was acquired. The number of I/Os column C182 stores the number of I/Os to a logical page 410 for each time stored in the time column C181. In this example, 24-hours worth of the number of I/Os per minute is acquired. One day's worth of changes in the number of I/Os is monitored since the accesses will be concentrated either in the afternoon or at night in accordance with the type of application program P210. However, the monitoring time is not limited to a 24-hour period from 0 hours until 24 hours. For example, it is also possible to configure another time period, such as 18 hours.

FIG. 17 shows an example of the by-page peak time determination policy information T190. The peak time determination policy information T190 stores information for computing the second threshold THpp for detecting a peak time for each logical page.

The policy information T190, for example, comprises a policy identifier column C190 and a value column C191. The policy identifier column C190 stores information denoting the type of policy. Information that denotes the policy type may include "a constant that is used for determining a peak time for each logical page". The value column C191 stores the value of this constant. The configuration may be such that the user configures the constant manually, or the management server 10 automatically configures the constant, or the user manually adjusts a constant value recommended by the management server 10.

Figure 18:
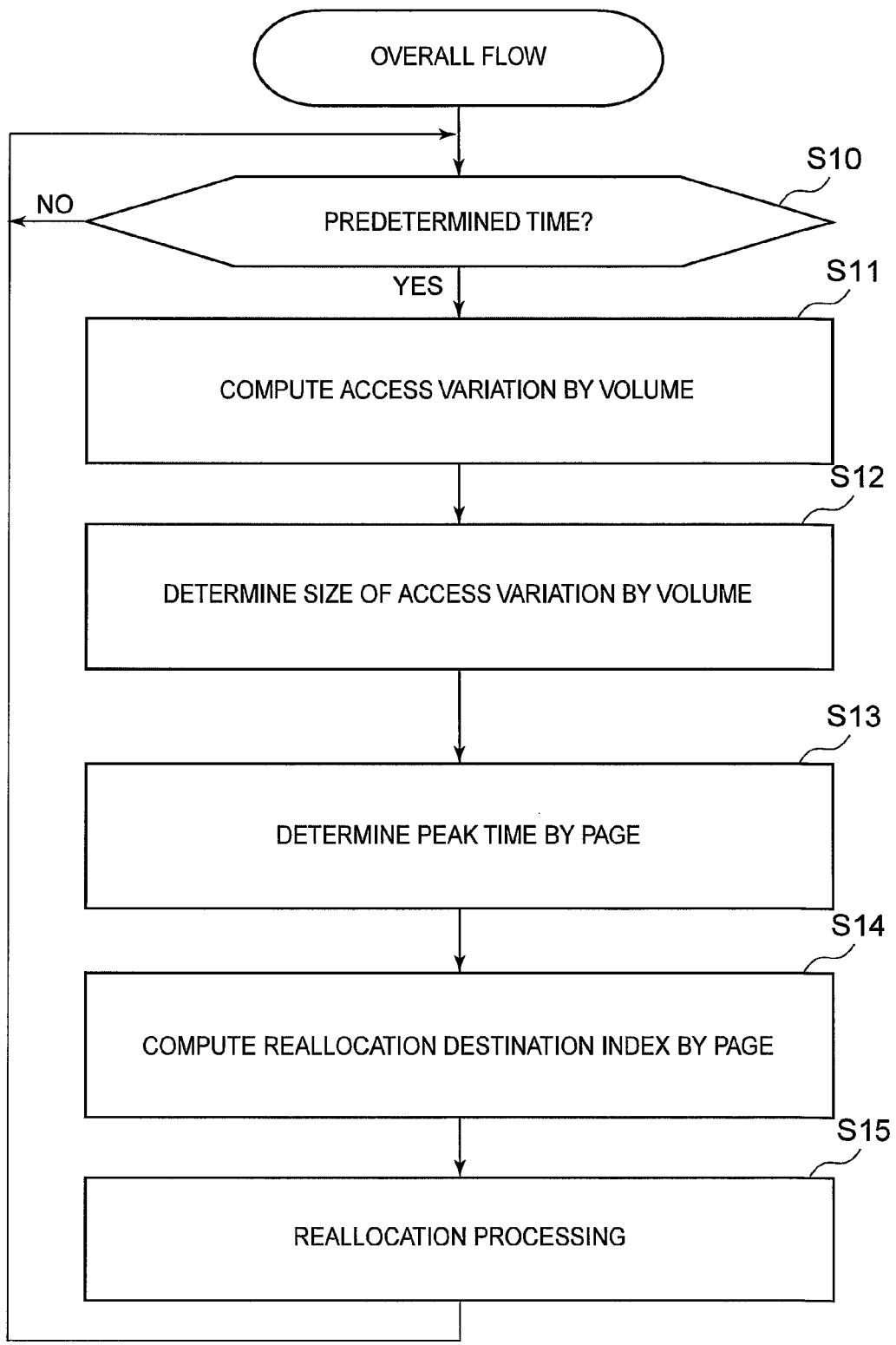
FIG. 18 is a flowchart of the overall operation of the management system.

FIG. 18 shows an entire management method in accordance with the management server 10. The respective processes described below are realized by the microprocessor reading and executing respective programs stored in the memory. Therefore, the subject of the following respective processes may be a program, or may be the microprocessor. Or, the following respective processes may also be explained with the management server as the subject. For convenience sake, in this example, the operation of each program will be explained using the management server 10 as the subject.

Furthermore, the configuration may be such that either all or part of each program is realized using a dedicated hardware circuit. The respective programs may be installed in the management server 10 via a program delivery server for delivering a program. In addition, a program that is affixed to a recording medium may be read and installed in the management server 10 from this recording medium.

As shown in FIG. 18, when a predetermined time has arrived (S10: YES), the management server 10 computes the access variation by logical pool volume (S11). Next, the management server 10, based on the access variation computed for each logical pool volume, determines whether this access variation is "large" or "small" (S12). For a logical pool volume 363 for which the access variation has been determined to be "large", the processing of S13, S14, and S15 is executed the following day for each logical page included in this logical pool volume 363.

In FIG. 18, it appears as if S10 through S12 and S13 through S15 are executed consecutively, but in fact S10 through S12 and S13 through S15 are executed on respectively different days.

The management server 10 determines the peak times by page for each logical page 410 included in the logical pool volume 363 with a large access variation (S13). The peak time by page is the time period during which accesses concentrate on a logical page. As will be explained in detail below using FIG. 26, in a case where there are multiple time periods during which there is a concentration of accesses on a logical page, any time period with the highest number of I/Os may be detected as the peak time.

The management server 10 computes the number of I/Os per minute during the peak time as the reallocation destination determination index (S14). The management server 10 determines the actual volume (the physical page) to be associated with the logical page 410 based on the reallocation destination determination index and the response performance of the actual volume 361 (S15).

Figure 19:
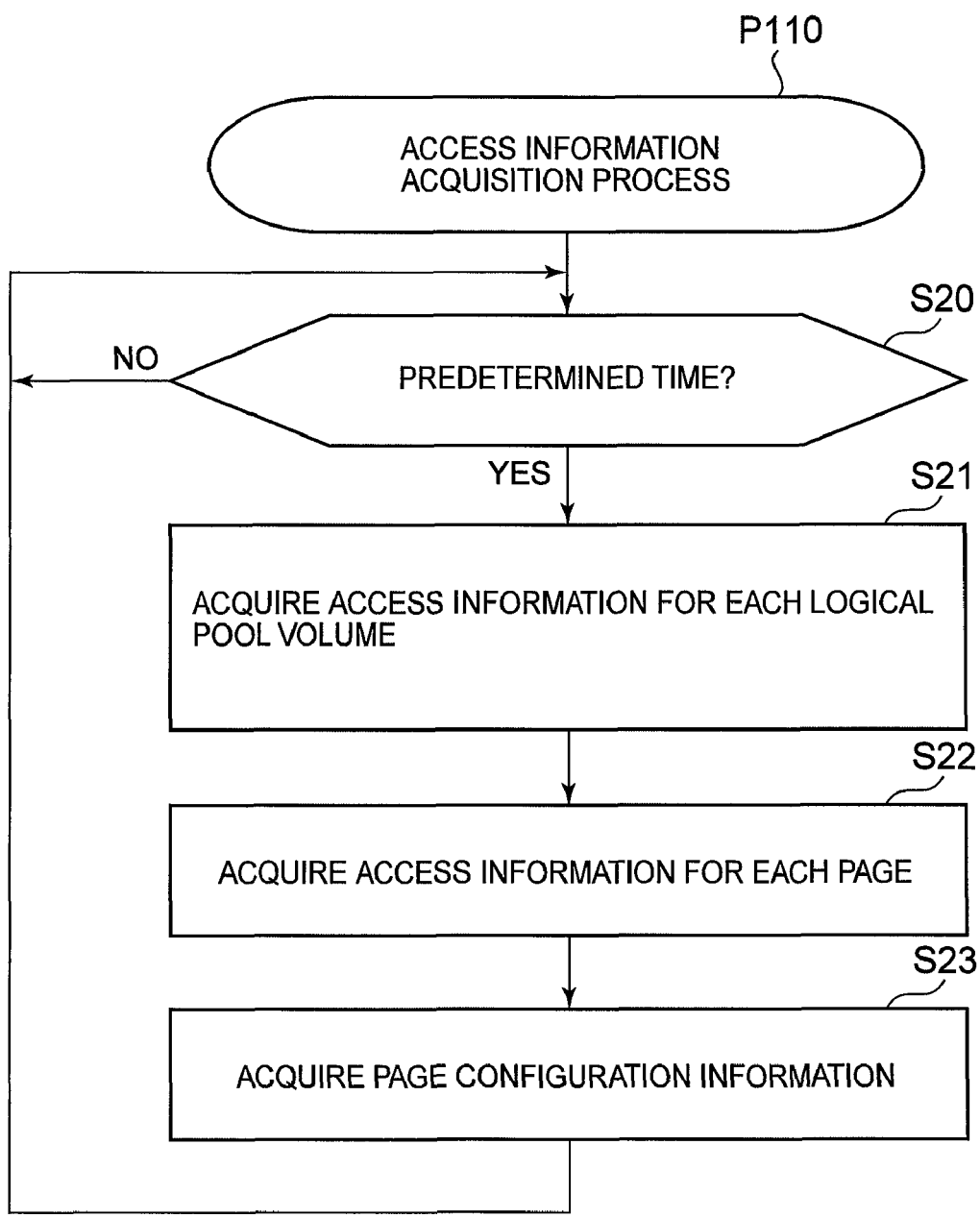
FIG. 19 is a flowchart of processing for acquiring access information.

FIG. 19 is a flowchart showing the process for acquiring the access information. This process is executed in accordance with the access information acquisition processing program P110 stored in the management server 10. The management server 10 determines whether or not a predetermined time for acquiring the access information has arrived (S20).

For example, in the case of a configuration in which the storage apparatus 30 only holds information related to accesses to the respective logical pool volumes 363 for five minutes, the predetermined time will be configured at either five minutes or slight shorter.

When the predetermined time arrives (S20: YES), the management server 10 acquires the access information for each logical pool volume 363 from the storage apparatus 30 (S21). In addition, the management server 10 acquires the access information of the respective logical pages 410 that constitute monitoring targets for each page (S22). The monitoring-target logical page is a logical page included in the logical pool volume determined to have a large access variation.

Lastly, the management server 10 acquires page configuration information from the storage apparatus 30 (S23), and returns to S20. The page configuration information is managed by the configuration information processing program P311 of the storage apparatus 30. The page configuration information comprises information as to the logical pool volume in which each logical page exists and the physical page to which each logical page is associated.

Figure 20:
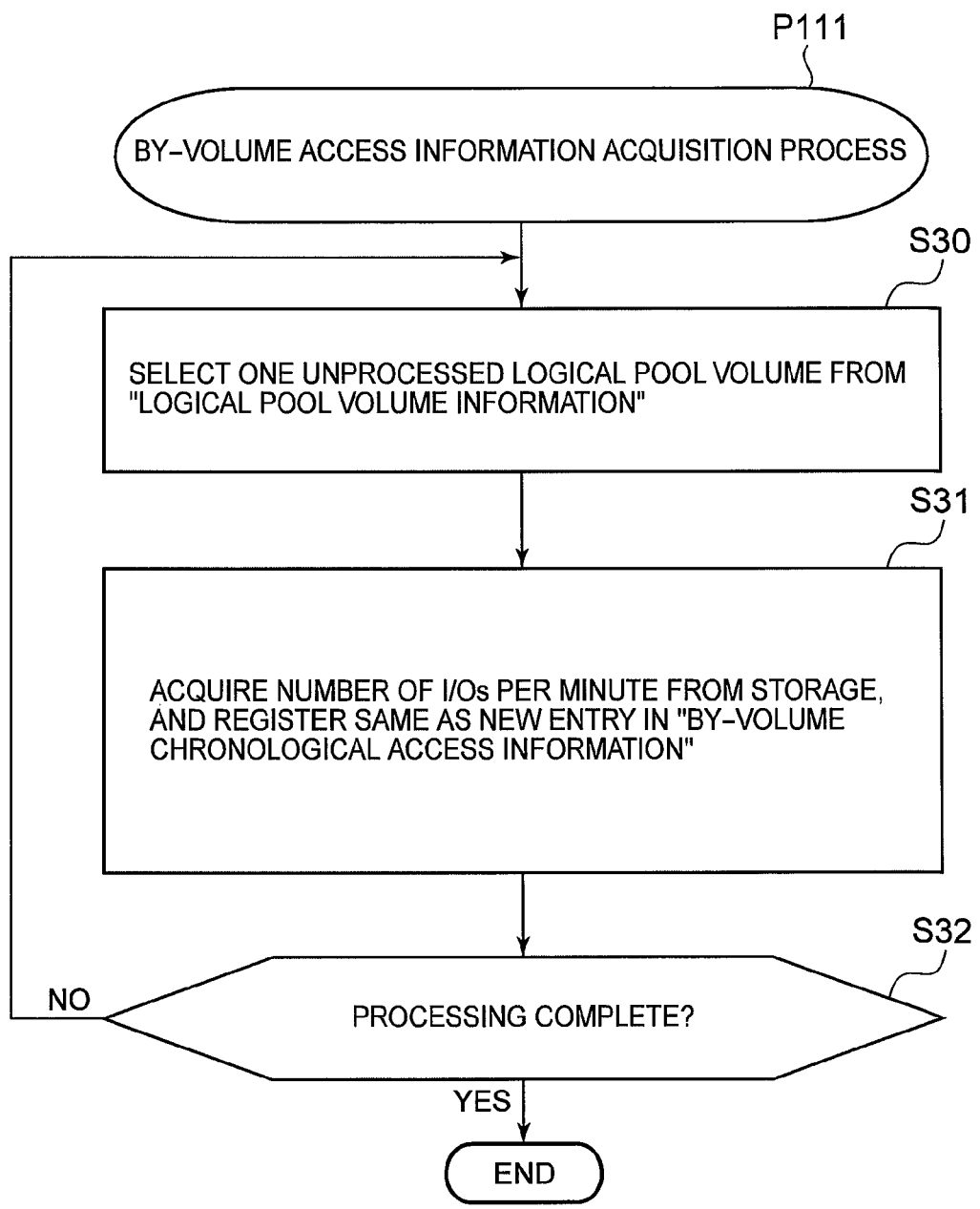
FIG. 20 is a flowchart showing the processing for acquiring access information by logical volume.

FIG. 20 is a flowchart showing by-volume access information acquisition processing. This processing is executed by the by-volume access information acquisition processing program P111. The management server 10 selects one unprocessed logical pool volume 363 from the logical pool volume information T120 (S30).

The management server 10 acquires from the storage apparatus 30 the number of I/Os per minute for this selected logical pool volume 363, and stores same in the by-volume chronological access information T150 (S31).

The management server 10 determines whether or not the access information (the number of I/Os per minute) has been acquired for all the logical pool volumes 363 that are registered in the logical pool volume information T120 (S32). In a case where there are no unprocessed logical pool volumes (S32: YES), this processing ends normally. In a case where there is an unprocessed logical pool volume (S32: NO), processing returns to S30.

Figure 21:
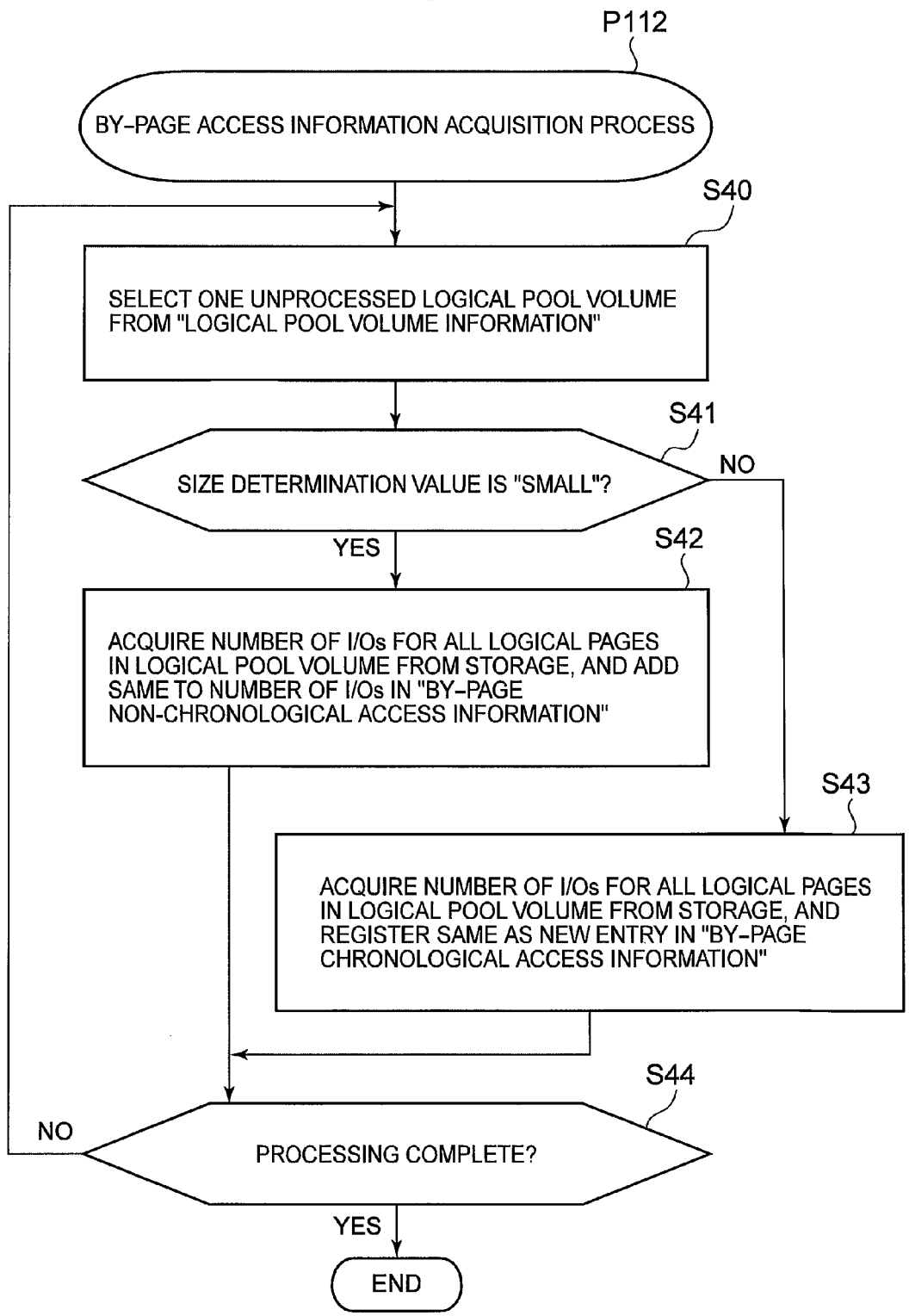
FIG. 21 is a flowchart showing the processing for acquiring access information by logical page.

FIG. 21 is a flowchart showing a by-page access information acquisition process. This process is executed by the by-page access information acquisition processing program P112. The management server 10 selects one unprocessed logical pool volume 363 from the logical pool volume information T120 (S40).

The management server 10 determines whether or not the access variation of the selected logical pool volume 363 has been configured as "small" by referencing column C142 of the by-volume access variation information T140 (S41).

In a case where it has been determined that the access variation of this logical pool volume is small (S41: YES), the management server 10 respectively acquires the number of I/Os of all the logical pages 410 that belong to this logical pool volume 363 from the storage apparatus 30, and adds same to the number of I/Os column C152 of the by-page non-chronological access information T170 (S42). That is, in the case of a logical pool volume 363 with a small access variation, the number of I/Os of each logical page 410 included in this logical pool volume is counted up for each logical page.

In contrast to this, in a case where the access variation of the selected logical pool volume has been determined to be large (S41: NO), the management server 10 acquires from the storage apparatus 30 the number of I/Os per minute for all the logical pages comprising this logical pool volume, and adds this number to the by-page chronological access information T180 as a new entry (S43). The number of I/Os per minute of each logical page included in this logical pool volume is collected from the storage apparatus 30 for a logical pool volume 363 with a large access variation and stored in the chronological access information T180.

The management server 10 determines whether or not processing has been implemented for all the logical pool volumes (S44). In a case where the above-mentioned processing has been implemented for all the logical pool volumes (S44: YES), this processing ends normally. In a case where an unprocessed logical pool volume remains (S44: NO), the management server 10 returns to S40.

Figure 22:
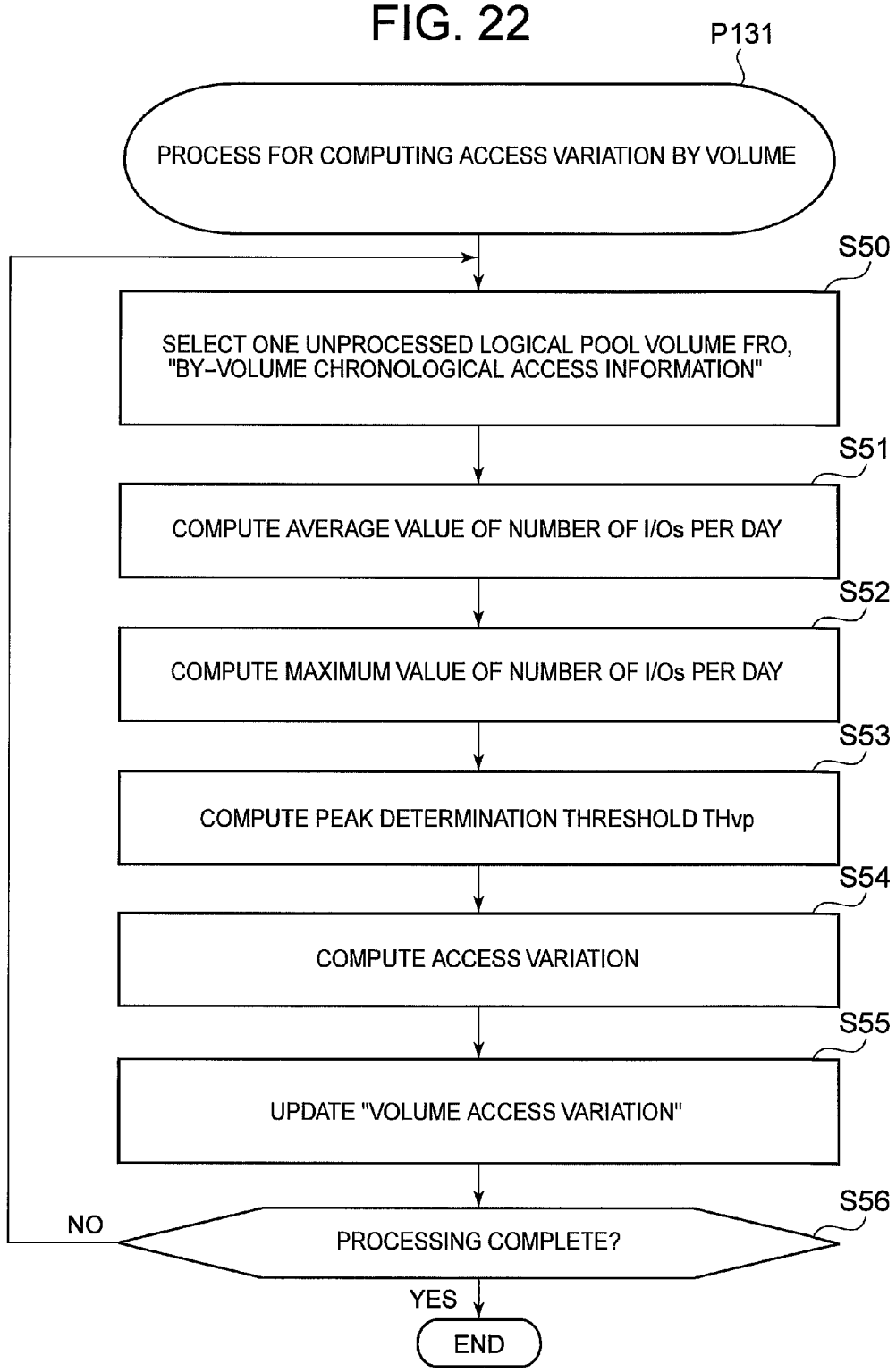
FIG. 22 is a flowchart showing the processing for computing the access variation by logical volume.

FIG. 22 is a flowchart showing the process for computing the access variation in volume units. This process is executed by the access variation computation processing program P131 of the management server 10.

The management server 10 selects one unprocessed logical pool volume 363 from the by-volume chronological access information T150 (S50). The management server 10 computes the average value (avg) of the number of I/Os per day for the selected logical pool volume (S51). Next, the management server 10 computes the maximum value (max) of the number of I/Os per minute per day (S52).

The management server 10 computes the difference between the maximum value (max) and the average value (avg), and multiplies the value of the peak time determination constant (for example, 0.7) shown in FIG. 14 by this difference (S53). In accordance with this, the peak time determination threshold THvp, which is the first threshold, is computed (THvp=(max−avg)×0.7).

The management server 10 detects the area of a region (the shaded portion in FIG. 12) in which the number of I/Os per minute in the logical pool volume is continuously equal to or greater than the threshold THvp, and computes the sum of this area (S54). The total area of regions in which the number of I/Os per minutes is continuously equal to or greater than the threshold THvp constitutes the access variation for each logical pool volume.

The management server 10 stores the computed access variation in the column C141 of the by-volume access variation information T140 (S55). The management server 10 determines whether or not processing has been performed for all the logical pool volumes (S56). In a case where this processing has been executed for all the logical pool volumes (S56: YES), this processing ends normally. In a case where an unprocessed logical pool volume exists (S56: NO), the management server 10 returns to S50.

Figure 23:
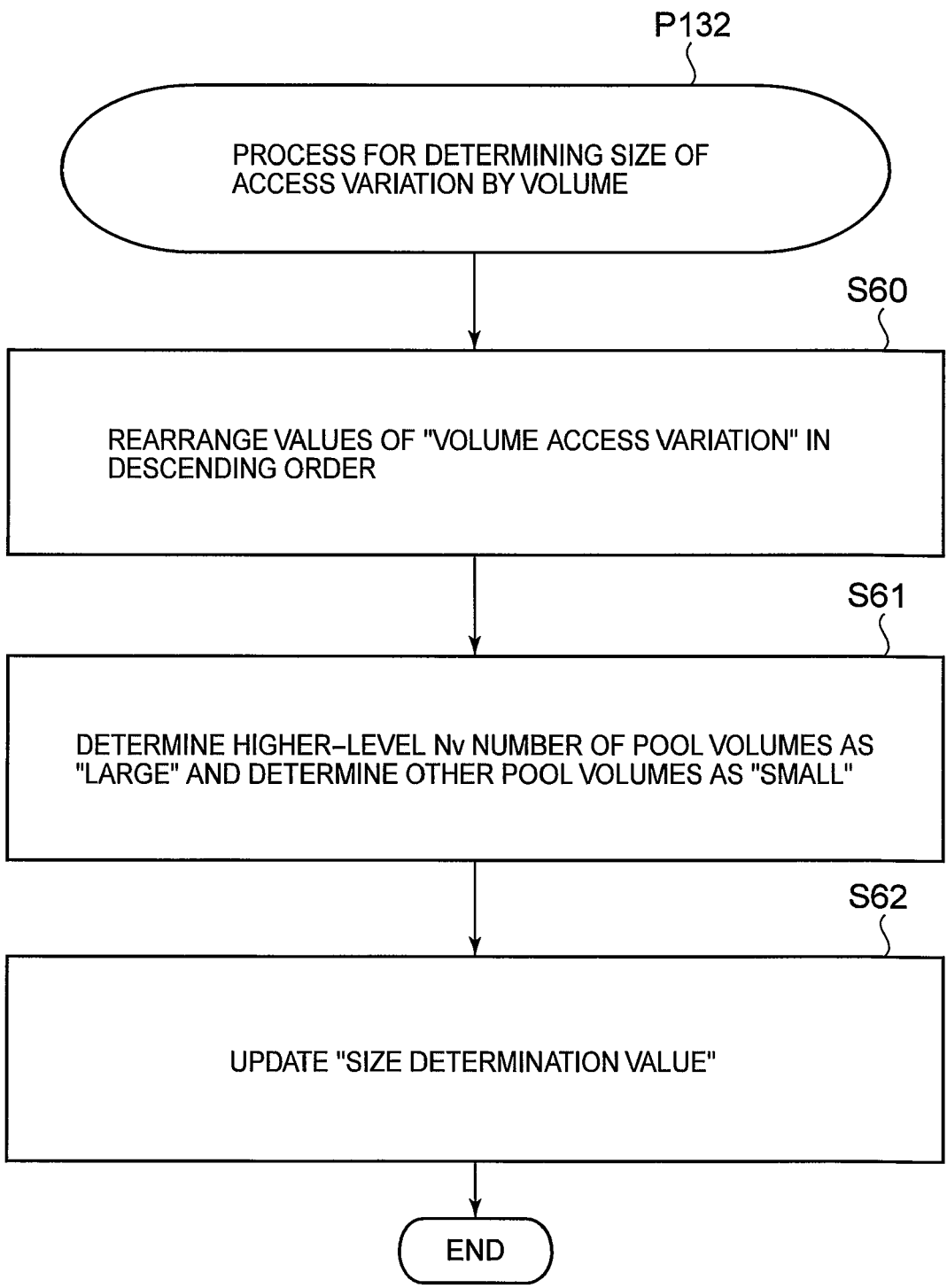
FIG. 23 is a flowchart showing the processing for determining the size of the access variation by logical volume.

FIG. 23 is a flowchart showing the process for determining the size of the access variation by volume. This process is executed by the access variation size determination processing program P132 of the management server 10.

The management server 10 rearranges the values of the volume access variation column C141 of the by-volume access variation information T140 in descending order (S60). The management server 10 determines that the logical pool volume of the number of volume selections Nv from the top of the rearranged logical pool volumes has "a large access variation", and determines that logical pool volumes other than this one have "small access variations" (S61). That is, a determination is made that only the higher-level Nv number of logical pool volumes with large access variations have "large access variations". The management server 10 updates the value of the size determination value column C142 of the access variation information T140 (S62), and ends this processing normally.

Figure 24:
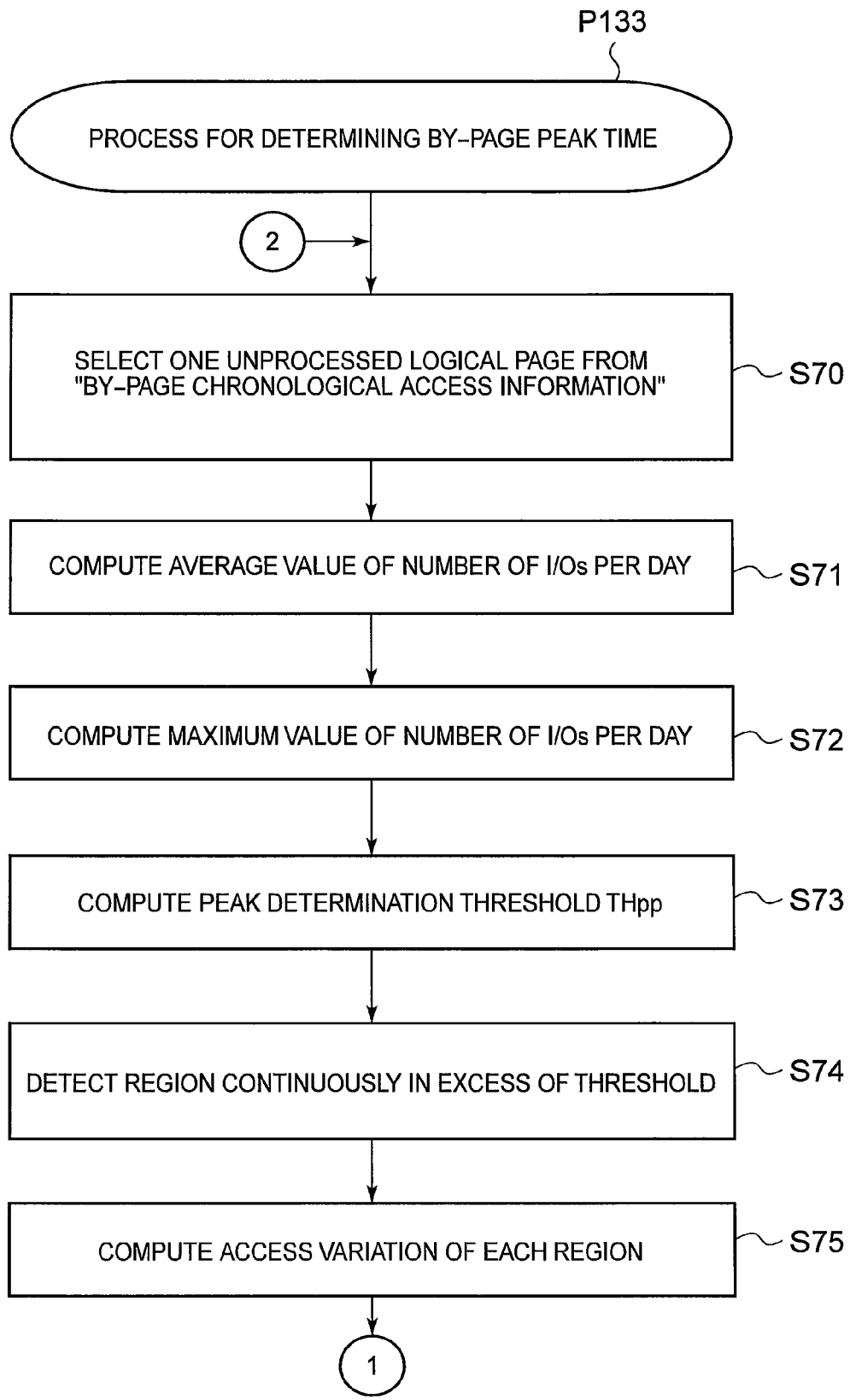
FIG. 24 is a flowchart of the processing for determining a peak time period by logical page.
Figure 25:
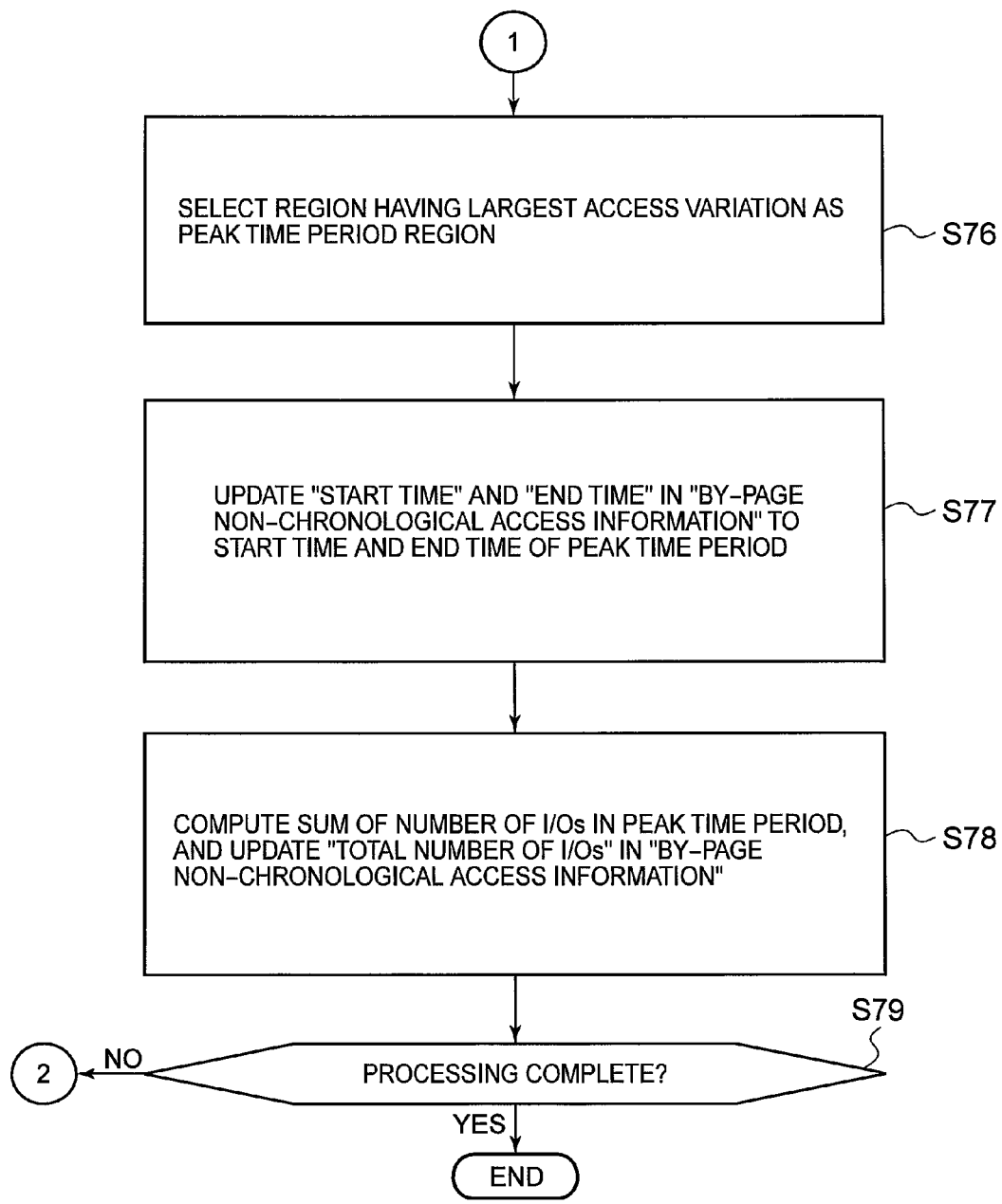
FIG. 25 is a continuation of the flowchart of FIG. 24.

FIGS. 24 and 25 are flowcharts showing the process for determining the peak time by page. This process is executed by the by-page peak time determination program P133 of the management server 10.

The management server 10 selects one unprocessed logical page 410 from the by-page chronological access information T180 (S70). The management server 10 computes the average value of the number of I/Os per minute per day for the selected logical page (S71). In addition, the management server 10 computes the maximum value of the number of I/Os per minute per day (S72).

The management server 10 computes the threshold THpp for determining the peak time by page by multiplying the constant stored in the policy information T190 by the difference between the maximum value and the average value (S73: THpp=(max−avg)×constant). The threshold THpp corresponds to the "second threshold".

The management server 10 detects from among the number of I/Os per minute of a logical page the region (time period) which is continuously equal to or greater than the threshold THpp (S74). The management server 10 computes this area for each detected region as the access variation (S75). Move to FIG. 25.

The management server 10 computes the access variation for each region in a case where multiple regions in which the number of I/Os per minutes is equal to or greater than the threshold THpp are detected. The management server 10 selects the region for which the access variation is the maximum of the multiple access variations computed as the peak time period of this logical page (S76).

The management server 10 respectively stores the start time of the peak time period in the start time column C173 and the end time of the peak time period in the end time column C174 of the by-page non-chronological access information T170 (S77).

In addition, the management server 10 computes the sum of the number of I/Os in the peak time period, and stores the computed value in the total number of I/Os column C171 of the by-page non-chronological access information T170 (S78). The management server 10 determines whether or not all of the logical pages have been processed (S79), and in a case where an unprocessed logical page exists (S79: NO), returns to S70. In a case were all the logical pages have been processed (S79: YES), the management server 10 ends this processing normally.

Figure 26:
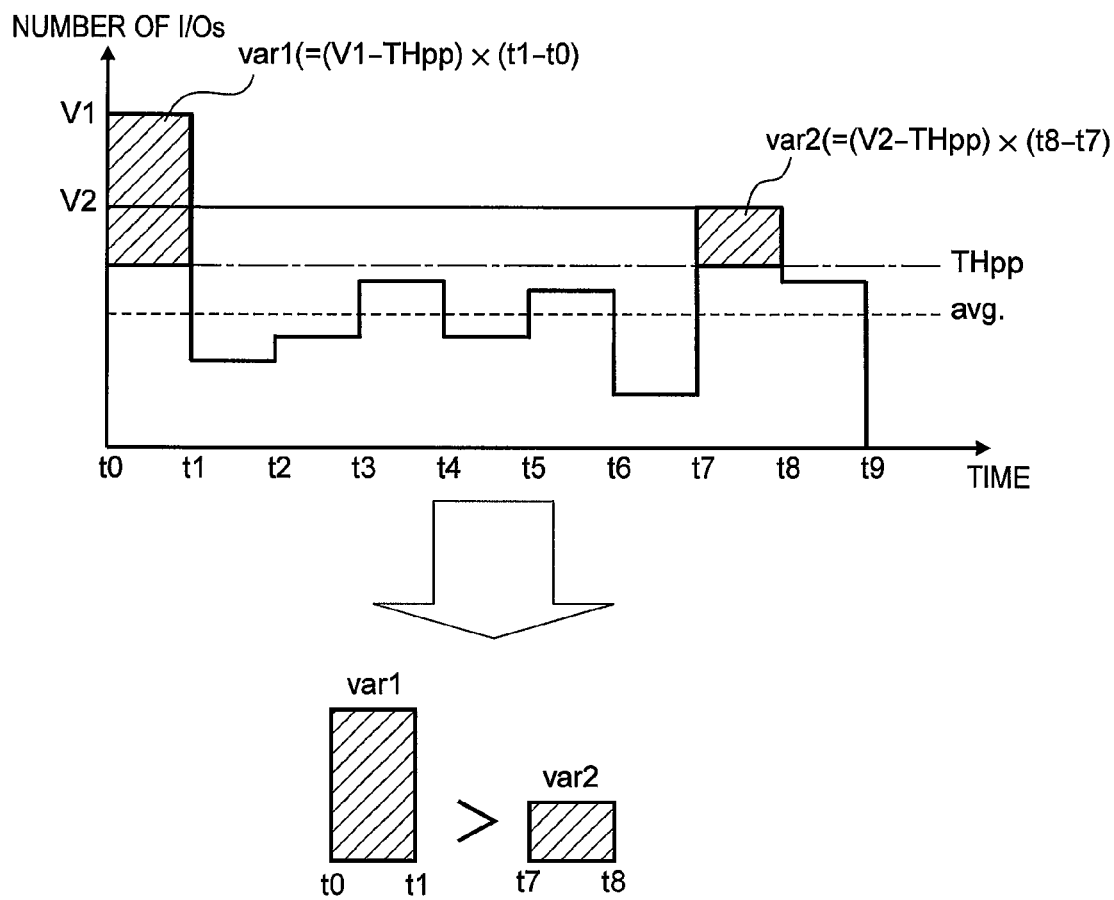
FIG. 26 is a schematic diagram showing how to detect a peak time period when accesses are concentrated on a logical page.

FIG. 26 schematically shows how a peak time is determined in page units. As described hereinabove, the access variation var for each logical page is computed as the area of a region in which the number of I/Os per minute is continuously equal to or greater than the threshold THpp.

In FIG. 26, two continuous regions, which are equal to or greater than the threshold THpp, are shown. In the one region, the number of I/Os per minute V1 continues from time t0 to time t1. In the other region, the number of I/Os per minute V2 continues from time t7 to time t8.

The access variation var1 of the one region is determined as var1=V1×(t1−t0). Similarly, the access variation var2 of the other region is determined as var2=V2×(t8−t7).

As described in S76 of FIG. 25, the management server 10 compares the two access variations var1 and var2, and selects whichever access variation var is larger as the time period region in which the access peak is occurring. In the example of FIG. 26, var1 is selected since var1 is larger than var2.

Accordingly, the management server 10 stores the start time t0 and the end time t1 of the var1 region in the by-page non-chronological access information T170 (S77). In addition, the management server 10 counts the number of I/Os that occurred from times t0 to t1, and stores this information in the by-page non-chronological access information T170 (S78).

In this example, the logical pool volume with a large access variation is selected like this as the target volume to be monitored by page, and a peak time (time period) is detected for all the logical pages inside the target volume. This makes it possible to discern the actual usage of the target logical pool volume by the host 20.

Figure 27:
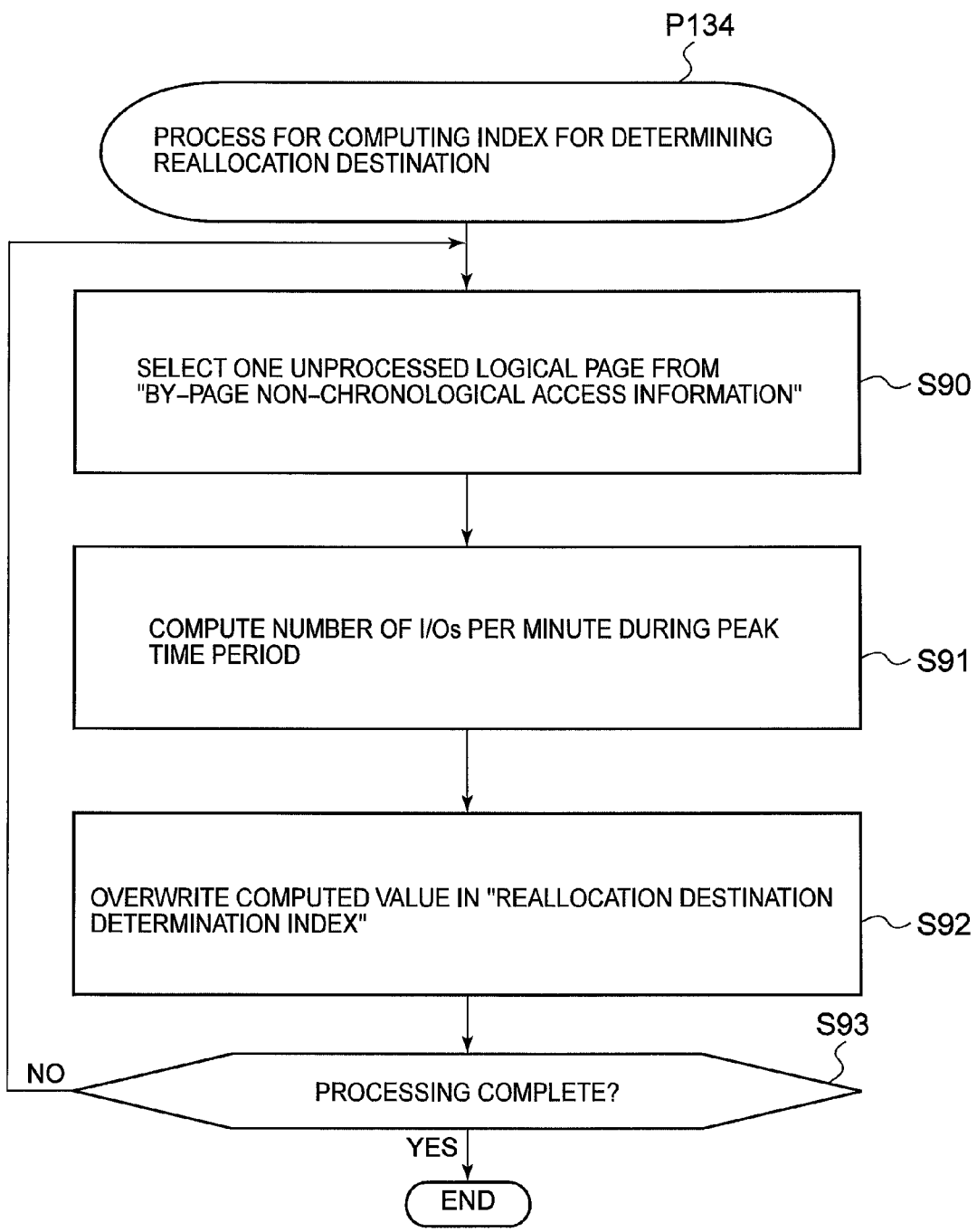
FIG. 27 is a flowchart of the processing for computing an index for determining a page reallocation destination.

FIG. 27 is a flowchart showing the process for computing an index to be used for determining a logical page reallocation destination. This process is executed by the reallocation destination determination index computation processing program P134 of the management server 10. FIG. 28 shows an example of the by-page non-chronological access information T170 to be updated in accordance with executing the processing of FIG. 27.

The management server 10 selects one unprocessed logical page from the by-page non-chronological access information T170 (S90). The management server 10 computes the number of I/Os per minute during the peak time period defined by the start time column C173 and the end time column C174 (S91).

For example, in the case of the logical page LA1 shown in FIG. 28, the total number of I/Os in the peak time period (15:00 to 15:59) is "500". Therefore, the average number of I/Os in the peak time period of the logical page LA1 is determined as 500/60=8.3. Similarly, in the case of the logical page LA2, the total number of I/Os in the peak time period (12:00 to 12:29) is "800". Therefore, the average number of I/Os in the peak time period of the logical page LA2 is determined as 800/30=26.7.

The management server 10 stores the average number of I/Os computed in S91 in the reallocation destination determination index column C172 (S92). That is, the reallocation destination determination index is the average number of I/Os per minute in a case where this logical page is used most frequently. This average number of I/Os per minute can be readily compared with the response performance of the real volume 361 (storage device 360).

The management server 10 determines whether or not processing has been performed for all the logical pages of the logical pages registered in the by-page non-chronological access information T170 (S93). In a case where no unprocessed logical pages remain (S93: YES), this processing ends normally. In a case where an unprocessed page exists (S93: NO), processing returns to S90.

Figure 29:
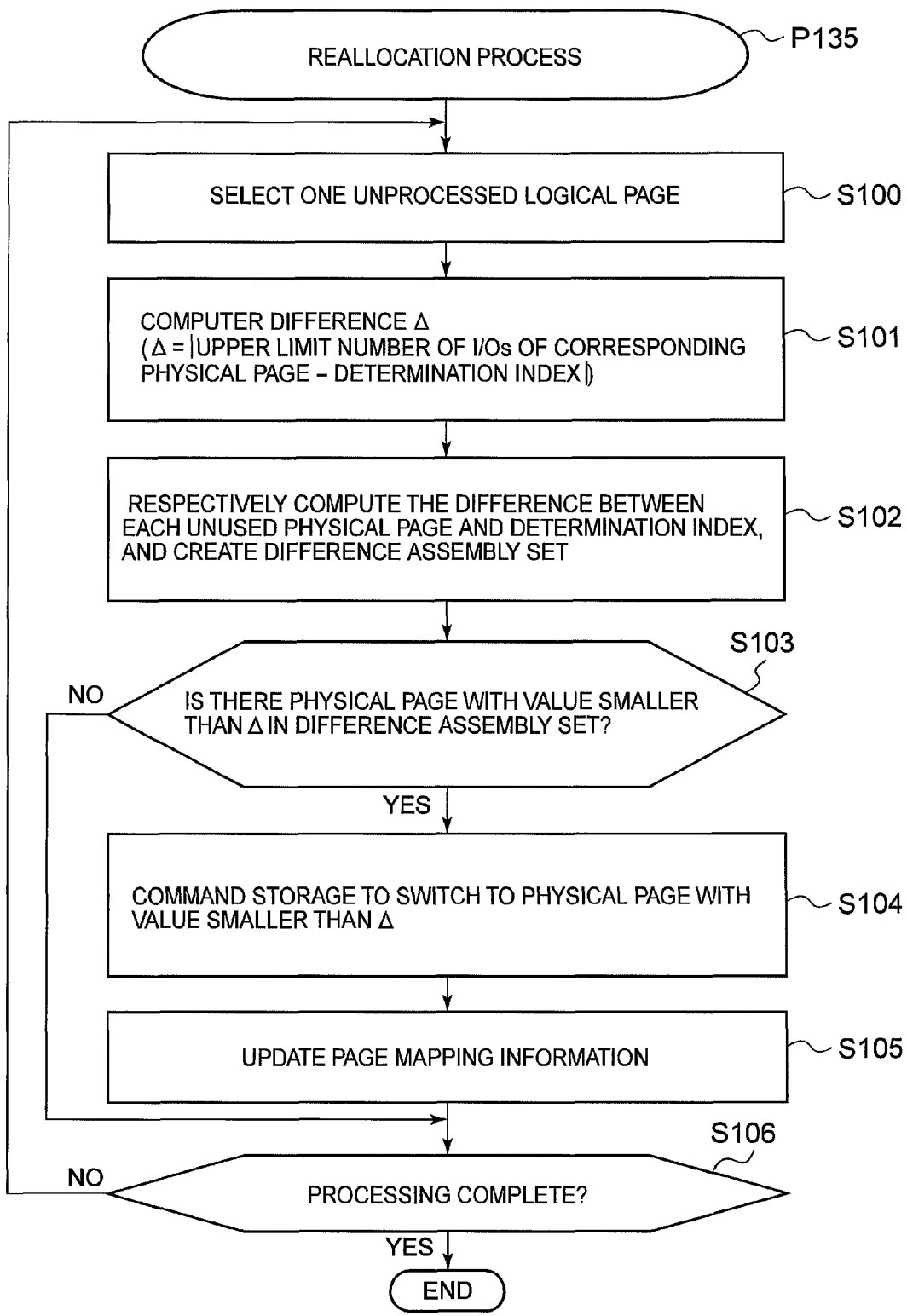
FIG. 29 is a flowchart of reallocation processing.

FIG. 29 is a flowchart showing reallocation processing. This process is executed by the reallocation processing program P135 of the management server 10. The management server 10 selects one unprocessed logical page from the by-page non-chronological access information T170 shown in FIG. 28 (S100).

Next, the management server 10 computes the difference Δ for the selected logical page (S101). The difference Δ is a value obtained by subtracting the reallocation destination determination index (C172 of FIG. 28) of this logical page from the upper limit number of I/Os (C132 of FIG. 10) of the physical page corresponding to the logical page. That is, the difference Δ shows the gap between the number of I/Os at the peak time of the reallocation-target logical page and the upper limit number of I/Os of the physical page that is allocated to this logical page.

In addition, the management server 10 creates a difference assembly set for each physical page configured as "unprocessed" in the column C131 of the page mapping information T130 (S102).

The difference assembly set is for computing as an absolute value the difference between the selected logical page reallocation destination determination index and the upper limit number of I/Os for each unused physical page. That is, the management server 10 computes as the difference assembly set the absolute value of the difference between each unused physical page and the number of I/Os at the peak time of the reallocation-target logical page.

The management server 10 determines whether or not an unused physical page comprising a smaller value than the difference Δ computed in S101 exists inside the difference assembly set (S103).

In a case where an unused physical page comprising a smaller value than the difference Δ exists (S103: YES), the management server 10 issues an instruction to the storage apparatus 30 to switch the destination corresponding to the logical page to this unused physical page (S104).

The management server 10 updates the page mapping information T130 upon receiving a switchover-complete notification from the storage apparatus 30 (S105). The management server 10 repeats S100 and subsequent steps until there are no more unprocessed logical pages (S106).

This processing will be explained in detail. In the case of the logical page LA1 shown in FIG. 28, the value of the reallocation destination index (hereinafter, the index) is "8.3". Referring to the page mapping information T130 of FIG. 10, the physical page PA1 is associated with the logical page LA1, and the upper limit number of I/Os of the physical page PA1 is "30/min". Therefore, the difference Δ for the logical page LA1 is 21.7 (21.7=|30−8.3|).

The difference assembly set of each unused physical page will be considered. According to the page mapping information T130, there are four unused physical pages PA3, PC2, PC3 and PC4. The upper limit number of I/Os of the physical page PA3 is "30/min", and the upper limit number of I/Os for the physical pages PC2, PC3, PC4 is "10/min".

Therefore, the difference assembly set becomes (PA3: 21.7 (=|30−8.3|), PC2: 1.7 (=|10−8.3|), PC3: 1.7 (=|10−8.3|), PC4: 1.7 (=|10−8.3|)).

Within the above-mentioned difference assembly set, there exists unused physical pages PC2, PC3 and PC4, which comprise a value (1.7) that is smaller than the target logical page LA1 index "8.3". Therefore, the logical page LA1 is associated with any one of the unused physical pages PC2, PC3, PC4 from the physical page PA1 to which it is currently associated.

The logical page LA1, which has a number of I/Os (8.3) that is smaller than the upper limit number of I/Os (30/min) is moved to a physical page with lower performance (any of PC2 through PC4) like this. This makes it possible to return the high-performance physical page PA1 allocated to the logical page LA1 to the pool as an unused page to be allocated to another logical page.

Another specific example will be explained. In the case of the logical page LA2 shown in FIG. 28, the index is "26.7". The upper limit number of I/Os of the physical page PB1 that is allocated to the logical page LA2 is "20/min". Therefore, the difference Δ for the logical page LA2 becomes 6.7 (6.7=|20−26.7|).

The difference assembly set of the unused physical pages PA3, PC2, PC3, and PC4 becomes (PA3: 3.3 (=|30−26.7|), PC2: 16.7 (=|10−26.7|), PC3: 16.7 (=|10−26.7|), PC4: 16.7 (=|10−26.7|)).

Within the above-mentioned difference assembly set (3.3, 16.7, 16.7, 16.7) there exists the unused physical page PA3, which comprises a value (3.3) that is smaller than the logical page LA2 index "6.7". Therefore, the logical page LA2 is associated with the unused physical page PA3 from the physical page PB1 with which it is currently associated.

The logical page LA2, which has a number of I/Os (26.7) that exceeds the upper limit number of I/Os (20/min), is moved to the higher performance physical page PA3. This makes it possible to shorten the response time in a case where the host 20 has accessed the logical page LA2, thereby enhancing the quality of the service.

FIG. 30 shows an example of a screen G10 for configuring a policy. The policy configuring screen G10 is created by the policy configuration processing program P120 of the management server 10, and is displayed on the output device 16.

The policy configuring screen G10 comprises three areas: GA1, GA2, and GA3. The first area GA1 is for configuring policy information to be used for computing the access variation by volume. The second area GA2 is for configuring policy information to be used for computing the access variation by page. The third area GA3 is for displaying simulation results.

The first area GA1 corresponds to the policy information T160 shown in FIG. 14. The first area GA1, for example, comprises a slider SL1 for configuring the peak time determination constant, a slider SL2 for configuring the number of volume selections, and a button B10 for selecting volumes individually.

When the user operates the slider SL1, the value of the constant used for computing the threshold THvp changes. The value configured with the slider SL1 is stored in column C161 of the policy information T160. When the user operates the slider SL2, the number of selections for selecting the volume to be monitored by page changes. The value configured using the slider SL2 is stored in column C161 of the policy information T160. A case in which the button B10 is operated will be explained below using FIG. 31.

The second area GA2 corresponds to the policy information T190 shown in FIG. 17. The second area GA2 comprises a slider SL3. When the user operates the slider SL3 the value of the constant for computing the threshold THpp changes. The value configured using the slider SL3 is stored in column C191 of the policy information T190.

The third area GA3 is for showing a simulation result. In the third area GA3, the sum of the access variations prior to executing the page reallocation (the sum of the access variations of all the logical pool volumes) and the estimated value of the sum of the access variations in a case where the page reallocation has been executed are listed up and displayed. Methods for estimating the access variation will be described below using FIGS. 33, 34, and 35.

Figure 31:
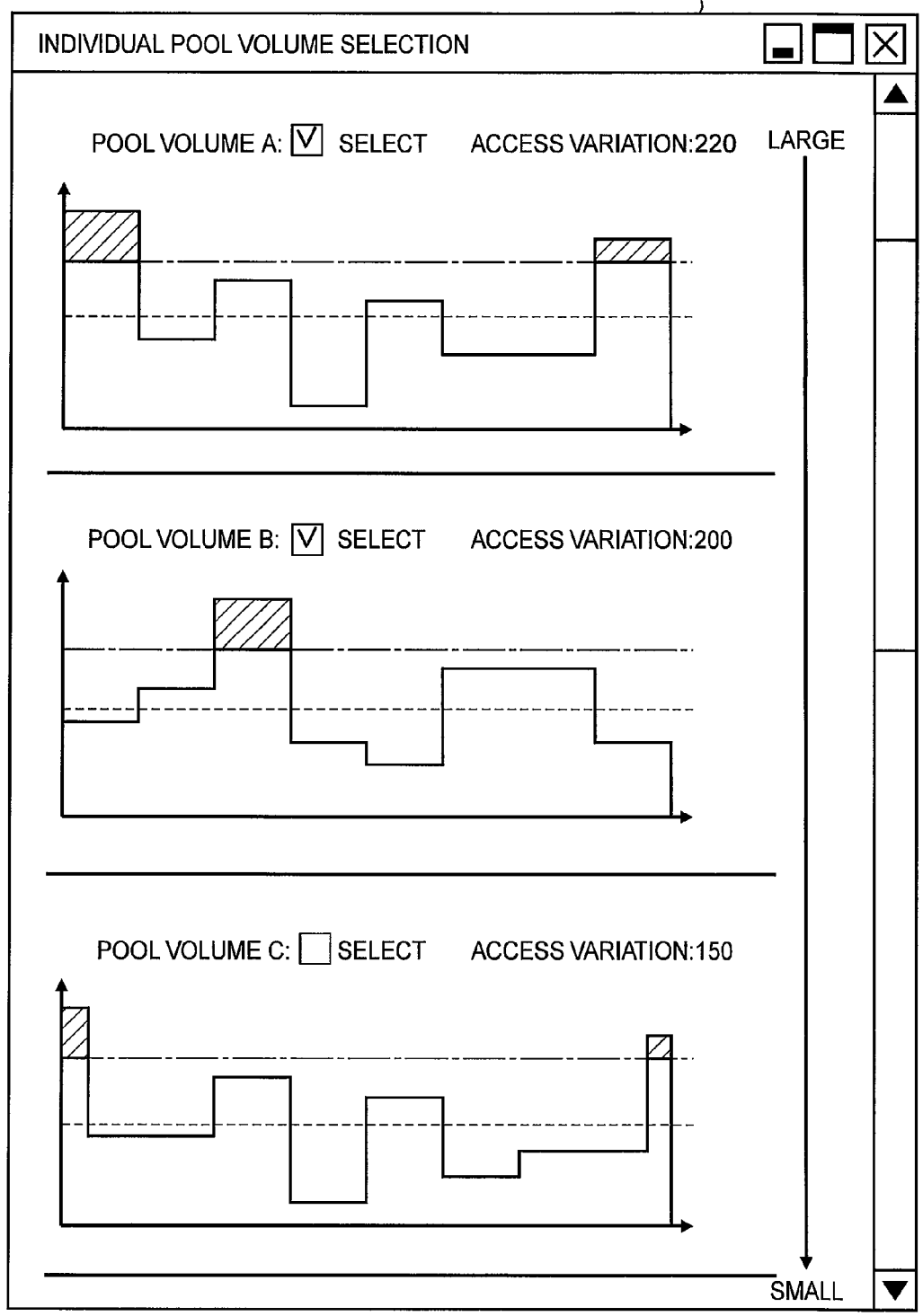
FIG. 31 is a diagram showing an example of a screen for individually selecting pool volumes (logical volumes)

FIG. 31 shows a screen G20 for individually configuring a target volume for monitoring the access variation in page units. When the user operates the button B10 in the screen G10 shown in FIG. 30, the screen switches to screen G20 shown in FIG. 31.

Logical pool volumes with large access variations are displayed in order on the screen G20 for individually selecting a logical pool volume from among the multiple logical pool volumes 363 managed by the storage apparatus 30.

In FIG. 31, the logical pool volume A, the logical pool volume B and the logical pool volume C are listed in order from the one with the largest access variation, and as such are arranged from the top in the order A, B, C. In screen G20, for example, there are displayed a logical pool volume name, an access variation value, a checkbox, and a graph for each candidate logical pool volume. The checkbox is used by the user to select a logical pool volume. The graph shows changes in the access variation of the logical pool volume over time.

In screen G20, the logical pool volumes with large access variations are arranged in order in readily visible locations. There is a high likelihood of access peaks occurring locally in a logical pool volume with a large access variation. That is, there is the likelihood of access becoming concentrated and response performance deteriorating during a specific period of the day. Furthermore, there is also the likelihood of using physical pages that have excessive performance compared to the amount of accesses.

Since the logical pool volumes are arranged in the screen G20 in descending order from the largest access variation, the user is able to easily select the logical pool volume for which the access variation is to be measured in page units.

Figure 32:
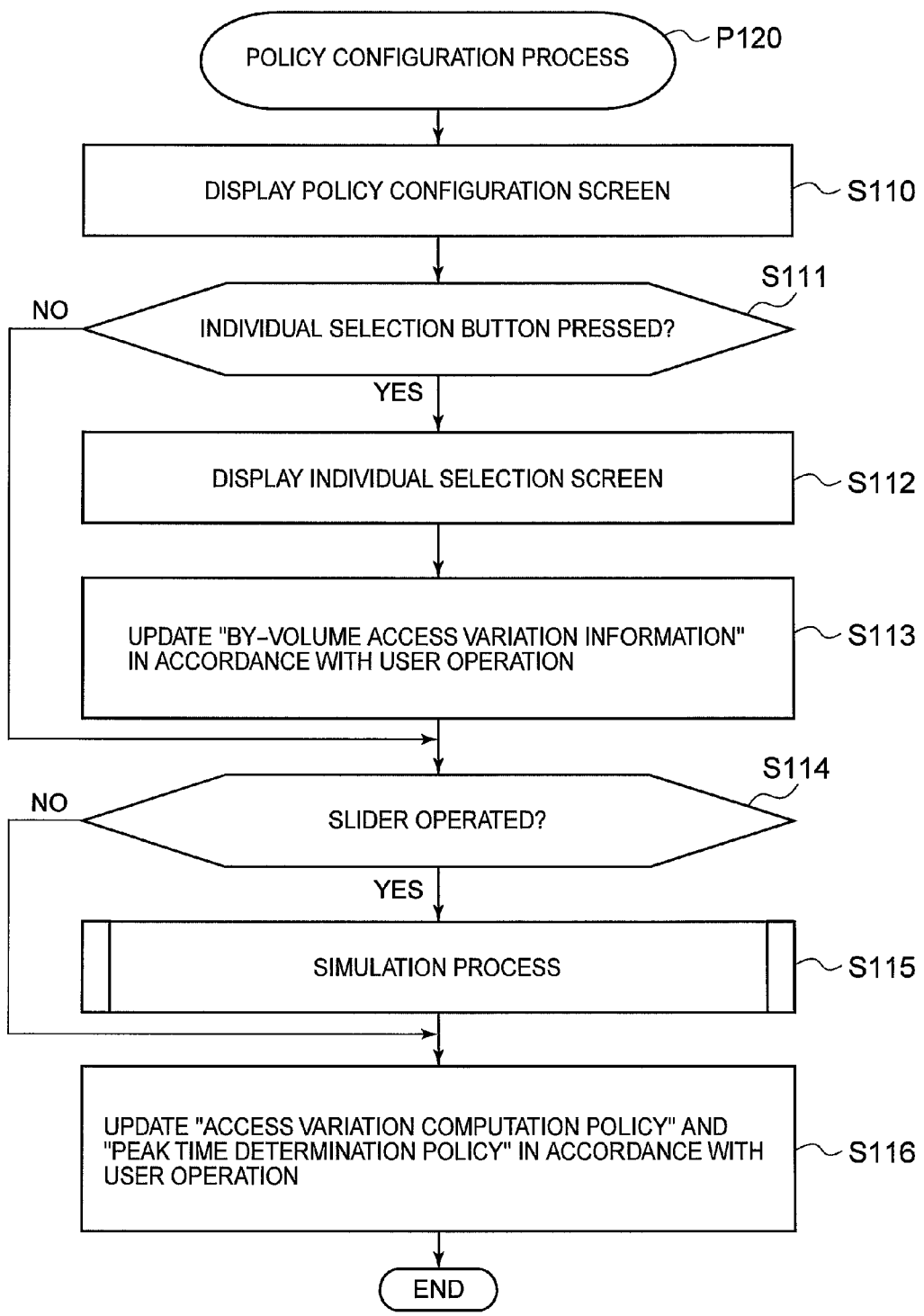
FIG. 32 is a flowchart of the processing for configuring a policy.

FIG. 32 shows the policy configuration process. This process is executed by the policy configuration processing program P120 of the management server 10. The management server 10 displays the policy configuration screen G10 shown in FIG. 30 on the output device 16 (S110). The management server 10 determines whether or not the button B10 has been operated (S111).

When the button B10 is operated (S111: YES), the management server 10 displays the screen G20 shown in FIG. 31 on the output device 16 (S112). The management server 10 updates the by-volume the access variation information T140 in accordance with the user operation with respect to the checkbox (S113). That is, the logical pool volume identifier selected by the user is added to the access variation information T140. In a case where the user does not operate the button B10, steps S112 and S113 are skipped.

The management server 10 makes a determination as to whether or not the sliders SL1 through SL3 have been operated (S114), and in a case where any of the sliders has been operated (S114: YES), executes a simulation process (S115). Simulation processing will be described hereinbelow.

The management server 10, in accordance with a user operation, updates the policy information T160 for computing the access variation by volume and the policy information T190 for determining the peak time (S116).

Figure 33:
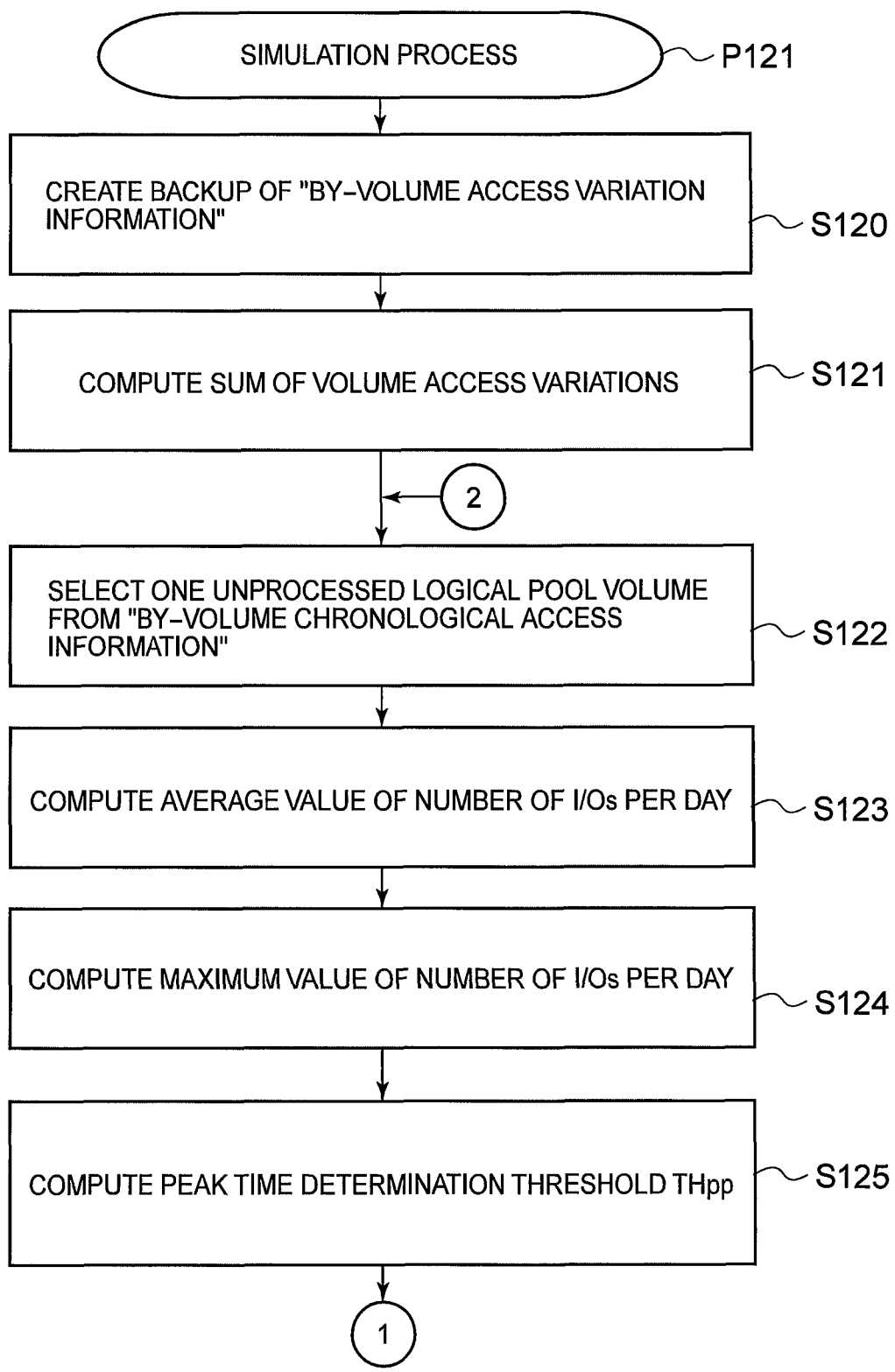
FIG. 33 is a flowchart of a simulation process.
Figure 34:
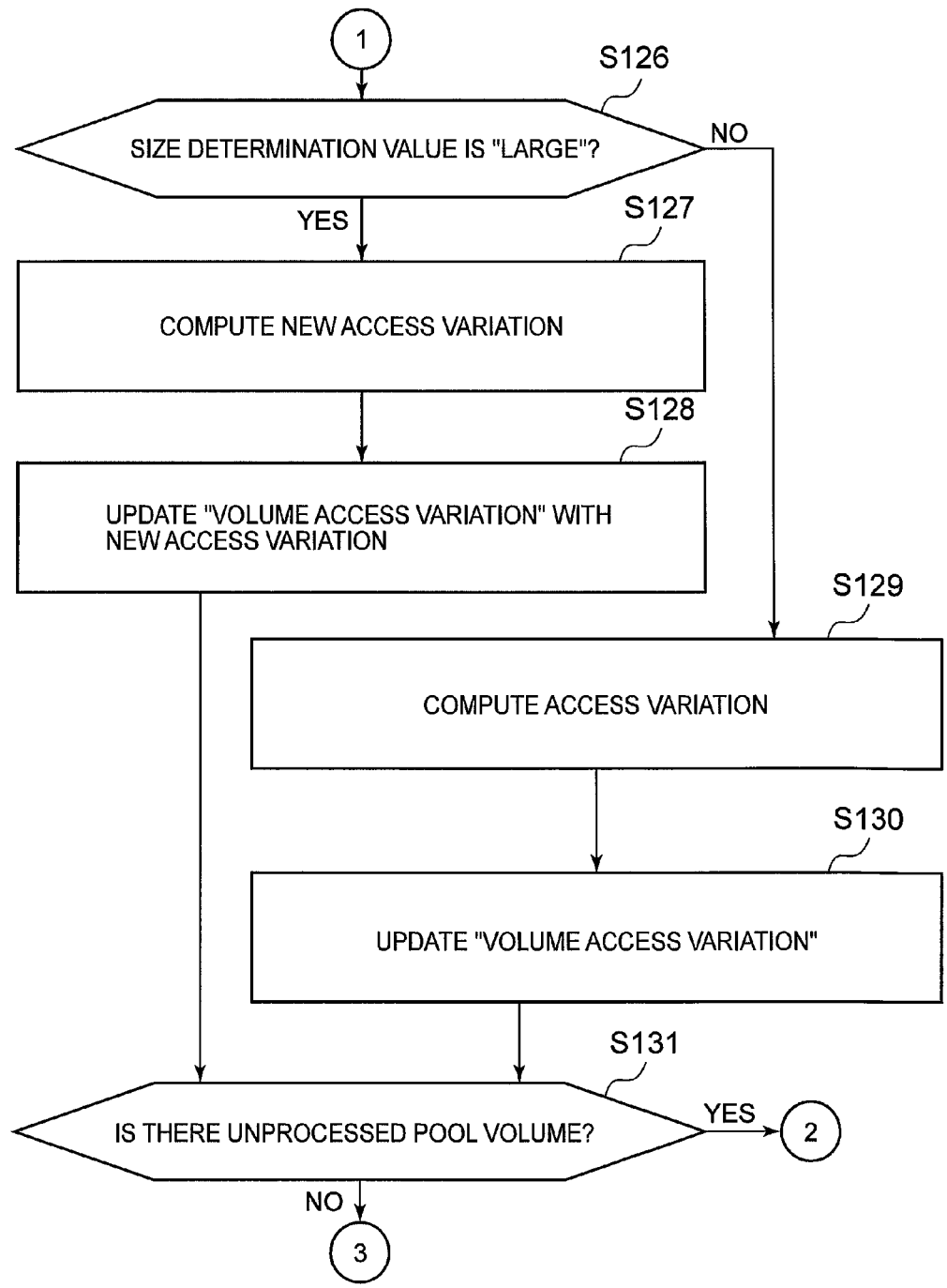
FIG. 34 is a continuation of the flowchart of FIG. 33.
Figure 35:
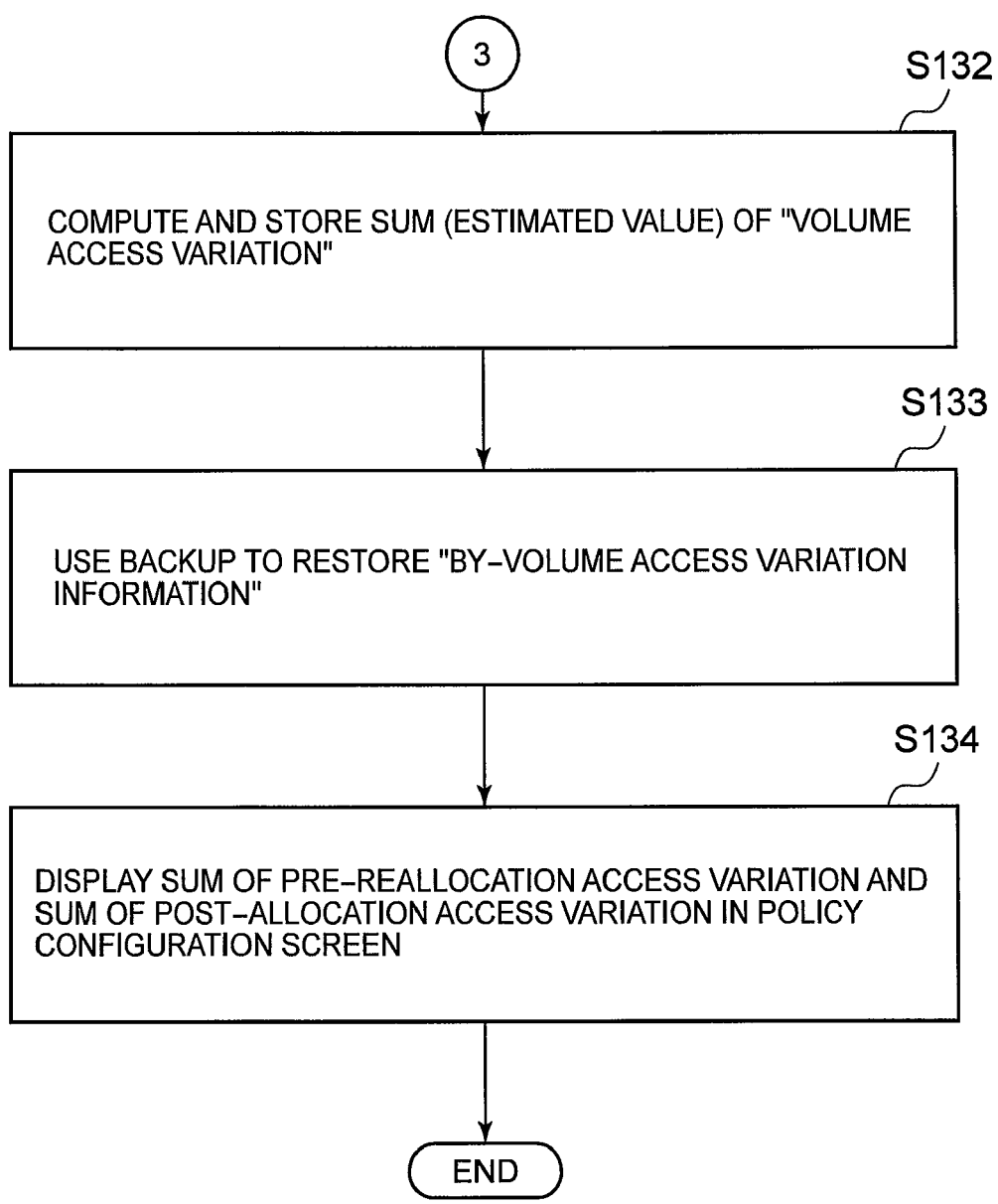
FIG. 35 is a continuation of the flowchart of FIG. 34.

FIGS. 33, 34 and 35 are flowcharts of the simulation process shown as S114 in FIG. 32. This process is executed by the simulation processing program P121 of the management server 10.

The management server 10 creates a backup of the by-volume access variation information T140 prior to the simulation (S120). The management server 10 computes the sum of the access variations stored in the volume access variation column C141 of the by-volume access variation information T140 (S121). This computed value becomes the "sum of the pre-reallocation access variation", which is displayed in the third area GA3 of the screen G10.

Next, the management server 10 computes the access variation by volume as described hereinabove (S122 through S125), determines the size of the computer access variation (S126), and estimates the access variation in a case where the page has been reallocated.

The management server 10 selects one unprocessed logical pool volume from among the logical pool volumes registered in the by-volume access variation information T140 (S122). The management server 10 computes the average value per minute of the number of I/Os per day for the selected logical pool volume (S123).

In addition, the management server 10 computes the maximum value of the number of I/Os per minute (S124). The management server 10 computes the threshold THvp for determining the peak time by multiplying the constant specified using the slider SL1 in FIG. 30 by the difference between the maximum value and the average value (S125).

Move to FIG. 34. The management server 10 references the size determination value column C142 of the by-volume access variation information T140 and determines whether or not the access variation of the logical pool volume is large (S126).

In a case where the logical pool volume access variation is large (S126: YES), the management server 10 computes the access variation once again (S127). In the case of a large access variation, it is possible to reduce the access variation of this entire logical pool volume by reallocating the logical page included in this logical pool volume to an appropriate physical page.

Accordingly, the management server 10 uses the threshold THvp computed in S125 to compute the access variation in a case where the logical page is reallocated to another storage device. For the sake of convenience, this re-computed access variation will be called the new access variation. The management server 10 overwrites the value of the column C141 of the by-volume access variation information T140 with the new access variation computed in S127 (S128).

In a case where the logical pool volume access variation is small (S126: NO), the management server 10 computes the current access variation (S129) and stores same in the column C141 (S130). In the case of a small access variation, the access variation for each logical page included in this logical pool volume is not measured, and page reallocation is not executed. Therefore, the management server 10 computes the access variation based on the chronological access information T150 actually acquired.

The management server 10 determines whether or not there is an unprocessed logical pool volume (S131), and in a case where there is an unprocessed logical pool volume (S131: YES), returns to S122 of FIG. 33. In a case where there is no unprocessed logical pool volume (S131: NO), the management server 10 moves to S132 of FIG. 35.

Refer to FIG. 35. The management server 10 computes and stores the sum of the access variations of all the logical pool volumes (S132). This sum is an estimated value. This sum is the value obtained by adding the estimated value of the access variation in a case where a page reallocation has been executed for the logical pool volume for which the access variation has been determined to be large, and the actual access variation of the logical pool volume for which the access variation has been determined to be small.

The management server 10 uses the backup created in S120 to restore the by-volume access variation information T140 to its original state (S133). Lastly, the management server 10 displays on the policy configuration screen G10 the sum of the access variations computed in S121 (pre-reallocation value) and the sum of the access variations computed in S132 (post-reallocation estimated value) (S134).

Configuring this example like this achieves the following effects. In this example, from among all the logical pool volumes 363, the logical pool volume having a large access variation is selected as the target volume for measuring the access variation by page. In this example, a peak time period, during which accesses are concentrated on the respective logical pages 410 in the target volume, is detected, and an appropriate actual volume is selected in accordance with the number of I/Os during this peak time period. Therefore, in this example, it is possible to use the storage resource effectively without having to monitor changes in the access status 24-hours-a-day for all the logical pages 410 of all the logical pool volumes 363.

In this example, a logical pool volume with a large access variation is selected as being a volume in which load fluctuations occur, and, in addition, an appropriate physical page is allocated in accordance with the access status to each logical page included in this logical pool volume. Therefore, even in a case where load fluctuation has occurred with respect to an application program, it is possible to efficiently realize the appropriate page hierarchy management in response to this fluctuation.

In this example, the focus is on the region (time period) in which the number of I/Os is continuously equal to or greater than the thresholds THvp, THpp, and an index peculiar to the present invention called an access variation is computed. Therefore, it is possible to ignore temporary changes in the access status, and to execute page reallocation only in a case where the access status continuously changes. Furthermore, in a case where no particular access peak occurs, a logical page may be switched over to a corresponding physical page based on a per-day average value.

Furthermore, the present invention is not limited to the above-described embodiment. A person with ordinary skill in the art will be able to make various additions and changes that do not depart from the scope of the present invention.

What is claimed is:

1. A management system for managing a computer system that comprises a host computer and a storage,
wherein the storage provides multiple logical volumes to the host computer by associating each logical page in the respective logical volumes with a physical page of each of multiple storage devices,
the management system comprises:
a microprocessor;
a memory that is used by the microprocessor;
a user interface that is used by the microprocessor; and
a communication interface for the microprocessor to communicate with the host computer and the storage,
the memory stores:
first chronological information in which performance measurement values for each of the logical volumes in a predetermined time period including at least a first time period are chronologically arranged, and
second chronological information in which performance measurement values for each of the logical pages in another predetermined time period including at least a second time period that is later than the first time period are chronologically arranged,
the microprocessor outputs, via the user interface, at least any one or both of the first chronological information and the second chronological information stored in the memory, and
the logical page, for which the second chronological information is created, is selected based on a predetermined amount which is computed from the first chronological information and indicates the degree to which the performance measurement value for each of the logical volumes deviates from an average value of the first chronological information.

2. A management system according to claim 1, wherein the microprocessor obtains, as the predetermined amount, the area determined based on the region among the first chronological information in which the performance measurement value is continuously equal to or greater than a first threshold which is configured at a value that is equal to or greater than the average value.

3. A management system according to claim 2, wherein the microprocessor computes a sum of the predetermined amounts for each of the logical volumes, selects, as a target logical volume, a predetermined number of logical volumes in descending order from the sum of the predetermined amounts for each of the logical volumes, and creates the second chronological information for the logical page included in the target logical volume.

4. A management system according to claim 2, wherein the microprocessor computes a sum of the predetermined amounts for each of the logical volumes, displays via the user interface multiple logical volumes in descending order from the sum of the predetermined amounts for each of the logical volumes, selects as a target logical volume a logical volume selected by the user via the user interface, and creates the second chronological information for the logical page included in the target logical volume.

5. A management system according to claim 4, wherein the microprocessor graphically displays, via the user interface, the first chronological information in descending order from the sum of the predetermined amounts for each of the logical volumes.

6. A management system according to claim 2, wherein the microprocessor computes an access frequency representing a frequency of accesses to each of the logical pages included in the second chronological information, and instructs the storage via the communication interface to perform a reallocation in order to associate each logical page to a physical page that has performance corresponding to each access frequency.

7. A management system according to claim 6, wherein the microprocessor computes, as another predetermined amount, the area determined based on the region among the second chronological information in which the performance measurement value is continuously equal to or greater than a second threshold which is configured at a value that is equal to or greater than an average value of the second chronological information, detects a region comprising a maximum value of a multiple of the other predetermined amounts included in the second chronological information as a peak region, computes a performance measurement value per unit of time in the peak region as the access frequency, and instructs the storage via the communication interface to perform a reallocation in order to associate the logical page for which the access frequency has been computed, with a physical page that has performance of equal to or greater than the access frequency.

8. A management system according to claim 6, wherein the microprocessor estimates the sum of the predetermined amounts for each of the logical volumes subsequent to the reallocation having been performed by the storage, and outputs an estimation result via the user interface.

9. A management system according to claim 2, wherein a relatively high-performance storage device and a relatively low-performance storage device are mixed together in the multiple storage devices, and a logical page associated with a physical page of the high-performance storage device and a logical page associated with a physical page of the low-performance storage device are mixed together in the multiple logical pages that comprise the logical volume.

10. A method for managing a computer system comprising a host computer, a storage, and a management system,
wherein the storage comprises multiple logical volumes that are provided to the host computer, multiple storage devices each comprising multiple physical pages, and a control part for associating each logical page included in the each logical volume with any one of the physical pages,
the computer system management method causing the management system to execute the steps of:
creating and storing, based on information acquired from the storage, first chronological information in which performance measurement values for each of the logical volumes in a predetermined time period including at least a first time period are chronologically arranged,
selecting a measurement-target logical page from among the respective logical pages based on a predetermined amount which is computed from the first chronological information and indicates the degree to which the performance measurement value for each of the logical volumes deviates from an average value of the first chronological information,
creating and storing, based on information acquired from the storage, second chronological information in which performance measurement values for the each measurement-target logical volume in another predetermined time period including at least a second time period that is later than the first time period are chronologically arranged, and
outputting, via the user interface, at least any one or both of the stored first chronological information and the second chronological information.

11. A computer system management method according to claim 10, wherein the management system obtains, as the predetermined amount, the area determined based on the region among the first chronological information in which the performance measurement value is continuously equal to or greater than a first threshold which is configured at a value that is equal to or greater than the average value.

12. A computer system management method according to claim 11, wherein the management system computes a sum of the predetermined amounts for each of the logical volumes, selects, as the target logical volume, a predetermined number of logical volumes in descending order from the sum of the predetermined amounts for each of the logical volumes, and creates the second chronological information for the logical page included in the target logical volume.

13. A computer system management method according to claim 11, wherein the management system computes a sum of the predetermined amounts for each of the logical volumes, displays via the user interface multiple logical volumes in descending order from the sum of the predetermined amounts for each of the logical volumes, selects as a target logical volume a logical volume selected by the user via the user interface, and creates the second chronological information for the logical page included in the target logical volume.

14. A computer system management method according to claim 11, wherein the management system computes an access frequency representing a frequency of accesses to each of the logical pages included in the second chronological information, and instructs the storage via the communication interface to perform a reallocation in order to associate each logical page to a physical page that has performance corresponding to each access frequency.

15. A computer system management method according to claim 14, wherein the management system computes, as another predetermined amount, the area determined based on the region among the second chronological information in which the performance measurement value is continuously equal to or greater than a second threshold which is configured at a value that is equal to or greater than an average value of the second chronological information, detects a region comprising a maximum value of a multiple of the other predetermined amounts included in the second chronological information as a peak region, computes a performance measurement value per unit of time in the peak region as the access frequency, and instructs the storage via the communication interface to perform a reallocation in order to associate the logical page for which the access frequency has been computed, with a physical page that has performance of equal to or greater than the access frequency.

* * * * *